(12) United States Patent
Rutten

(10) Patent No.: US 9,540,943 B2
(45) Date of Patent: Jan. 10, 2017

(54) CONCENTRATING CONVENTIONAL THERMAL OR THERMODYNAMIC SOLAR POWER PLANT

(71) Applicant: RUTTEN NEW ENERGY SYSTEM SA, Blégny (BE)

(72) Inventor: Jean Rutten, Mortier (BE)

(73) Assignee: RUTTEN NEW ENERGY SYSTEM SA (BE)

(*) Notice: Subject to any disclaimer, the term of this patent is extended or adjusted under 35 U.S.C. 154(b) by 5 days.

(21) Appl. No.: 14/744,687

(22) Filed: Jun. 19, 2015

(65) Prior Publication Data

US 2015/0354398 A1 Dec. 10, 2015

Related U.S. Application Data

(63) Continuation-in-part of application No. PCT/BE2013/000066, filed on Dec. 17, 2013.

(51) Int. Cl.

| F01D 15/10 | (2006.01) |
|---|---|
| F03G 6/06 | (2006.01) |
| F02G 5/02 | (2006.01) |
| F01K 1/12 | (2006.01) |
| F01K 3/00 | (2006.01) |
| F01K 27/00 | (2006.01) |

(52) U.S. Cl.
CPC ............ F01D 15/10 (2013.01); F01K 1/12 (2013.01); F01K 3/004 (2013.01); F01K 27/005 (2013.01); F02G 5/02 (2013.01); F03G 6/065 (2013.01); *Y02E 10/46* (2013.01); *Y02E 20/14* (2013.01)

(58) Field of Classification Search
CPC ............ F01D 15/10; F03G 6/065; F01K 1/12; F01K 3/004; F01K 27/005; F02G 5/02; Y02E 10/46; Y02E 20/14

USPC .................................. 290/1 A, 2, 43, 54
See application file for complete search history.

(56) References Cited

U.S. PATENT DOCUMENTS

| 4,063,417 A | 12/1977 | Shields |
|---|---|---|
| 4,710,100 A | 12/1987 | Laing et al. |
| 5,247,796 A * | 9/1993 | Parker ............ F03G 6/065 60/641.15 |
| 2009/0179429 A1* | 7/2009 | Ellis ............ F01K 3/12 290/1 R |

(Continued)

FOREIGN PATENT DOCUMENTS

| AT | 506796 A4 | 12/2009 |
|---|---|---|
| EP | 0040748 A1 | 12/1981 |
| WO | 97/16629 A1 | 5/1997 |

OTHER PUBLICATIONS

Translation of International Preliminary Report on Patentability dated Jun. 21, 2015, in Corresponding PCT/BE2013/000066 (6 pages).

(Continued)

*Primary Examiner* — Viet Nguyen
(74) *Attorney, Agent, or Firm* — Hovey Williams LLP

(57) ABSTRACT

A power plant comprises: (a) a liquid pressurizing unit, (b) a Pelton turbine having a rotating shaft, (c) a duct connecting the pressurizing unit to the Pelton turbine for supplying pressurized liquid to the Pelton turbine, the duct being provided with at least one injector, and (d) a generator, advantageously an alternator, capable of being driven directly by the rotating shaft of the turbine, advantageously with the interposition of a gear system.

45 Claims, 11 Drawing Sheets

(56) References Cited

U.S. PATENT DOCUMENTS

| | | | | |
|---|---|---|---|---|
| 2011/0314810 A1* | 12/2011 | McBride | ................ | F15B 11/06 60/641.1 |
| 2012/0131915 A1* | 5/2012 | Olavarria Rodriguez-Arango | ... | F01K 1/04 60/641.8 |
| 2012/0291433 A1* | 11/2012 | Meng | ...................... | F01K 25/08 60/641.15 |
| 2014/0020383 A1* | 1/2014 | Yoshida | ................... | F03G 6/00 60/641.8 |
| 2014/0060050 A1* | 3/2014 | Kosamana | .............. | F01K 25/08 60/651 |
| 2014/0116045 A1* | 5/2014 | Mullard | ................. | F01K 13/00 60/641.2 |
| 2014/0175798 A1* | 6/2014 | Hoose, Jr. | ............... | F04D 27/02 290/54 |
| 2014/0352304 A1* | 12/2014 | Arias | ..................... | F03G 6/067 60/641.15 |

OTHER PUBLICATIONS

International Search Report mailed May 27, 2014 in Corresponding PCT/BE2013/000066 (3 pages).

* cited by examiner

CONCENTRATING CONVENTIONAL THERMAL OR THERMODYNAMIC SOLAR POWER PLANT

This application is a continuation in part application of PCT/BE2013/000066 filed on Dec. 17, 2013 and published under number WO 2014/094079 on Jun. 26, 2014, and claiming the benefit of the priority of Belgian patent application BE2012/0874 filed on Dec. 21, 2012

THE PRIOR ART

Numerous power plants are known which use steam superheated at high pressure and high temperature, steam which is expanded in one or more steam turbines to set it or them in rotation and to enable it (them) to drive a generator, advantageously an alternator, to produce electrical energy.

Fossil fuels or other heat sources can be used for the production of superheated steam. For example, concentrating solar power plants are known that use a series of parabolic, cylindroparabolic or Fresnel mirrors to concentrate the solar energy on a heating element to produce superheated water vapour.

The solar power plants of prior art are based on the Rankine cycle, in which superheated steam (e.g. to 550° C., at a pressure of $140 \times 10^5$ Pa) is expanded in the steam turbines. The overall efficiency of such plants is limited to less than 18%, i.e. for a sun to ground power of 1000 W/m$^2$, it is able to recover a maximum of 180 W/m$^2$.

Wind turbines are also known to generate electricity. By a method of prior art the blades of the wind turbine are mounted on a shaft which is capable of rotating the shaft of an alternator.

A version of a process using wind turbines has been proposed in the document U.S. Pat. No. 4,710,100. According to this variant (see in particular FIG. 7 of that document), a series of wind turbines are adapted to drive a series of pumps to pressurise water; the pressurised water is then fed to a Pelton turbine driving a generator. The efficiency of such an installation is limited by the performance of wind turbines, but especially the many pumps required to pressurize the water. This process does not use the Rankine cycle with superheated steam.

Also known from the document AT 506 796 is a heat engine using a Pelton turbine actuated by a fluid from a reservoir pressurized by the evaporation of isobutane, an extremely explosive compound. The process according to this document cannot be used and will be rejected by the person skilled in the art. In fact, the Pelton rotates in an atmosphere containing isobutane, while the operation of the Pelton will generate hot spots, even sparks. The explosive gas, isobutane, must expand isenthalpically at low temperature. In the process AT 506 796, the entire mass of water must be heated, for example at 50-60° C., to ensure evaporation of the isobutane liquid. Heating this amount of water requires a lot of energy and will be the source of an enormous energy loss. The machine according to AT 506 796 operates at low temperature (below 100° C.). If we take a temperature for heating the water to be pressurised by the isobutane as 70° C., and a temperature of 40° C. at the condenser, the theoretical efficiency of the machine would be less than 9%, which indicates to the person skilled in the art that the actual efficiency of this process will be zero, or even negative, if one takes into consideration the various heat and friction losses, etc. Finally, given the operating temperatures of the process according to AT 506 796, the maximum working pressure will be 7 bars. Assuming an mean working pressure of 4 bars, a 2000 kW machine will require a water flow of about 6 m$^3$/s, i.e. a reservoir that must have a capacity of more than 10000 m$^3$ to ensure the supply of water for 30 minutes. Such a process is therefore considered unrealistic to the person skilled in the art.

Document U.S. Pat. No. 4,063,417 discloses a system using geothermal hot water. The liquid hot water having an average temperature below 170° C. is fed to a Pelton to drive, while the released steam is supplied to a steam turbine. As far as the person skilled in the art is concerned, there is no energy or economic interest in combining one or more Peltons with a steam turbine, as it is economically and energetically more profitable to use a well dimensioned steam turbine.

Document EP0040748 discloses a boiler known for a fluid having a high degree of expansion. This boiler has a portion in contact with combustion fumes and a portion for heating a secondary fluid. To ensure proper heat exchange the primary fluid should remain liquid. If the fluid is water, the volume variation of the liquid water will be only about 2% for a temperature variation of about 50° C. This expansion of the liquid water will then generate an excess pressure in the upper bell comprising the wheel. The water level at the wheel will thus be lowered. Such a device will not therefore generate any energy but will rather block the circulation of hot water to the secondary exchanger Finally, document WO97/16629 discloses a system which drives a rotor by means of water deriving from two reservoirs pressurised by a gas and combined with a heat exchanger. As specified, the maximum recoverable work determined by the theoretical cycle (without any loss) of Carnot is 22.8%. With all the energy losses there will be with the WO97/16629 system, the actual efficiency of the system will be far less than 22.8%, namely an actual efficiency close to zero, even negative.

BRIEF DESCRIPTION OF THE INVENTION

The invention relates to a device that permits high actual efficiencies, for example 35% and over, and maximum high efficiencies determined by the Carnot cycle, for example over 50%, even 60%.

To arrive at such efficiencies the device according to the invention is a thermal or thermodynamic power station based on a thermodynamic cycle, advantageously a cycle at least essentially equivalent to a Rankine steam cycle for generating a liquid under pressure, combined (a) with at least one Pelton turbine for converting the energy of the pressurised liquid to a mechanical energy, and at least one generator or alternator for converting the mechanical energy to an electrical energy, said plant comprising:
  a unit for pressurising a liquid (UP) (FIG. 4),
  a Pelton turbine (P) comprising a rotating shaft,
  a duct (20) connecting the pressurisation unit to the Pelton turbine (P) for feeding the pressurised liquid to the Pelton turbine, said duct (20) being equipped with at least one injector, and
  a generator, advantageously an alternator, adapted to be driven by the rotating shaft of the turbine (P), advantageously with the interposition of a gear system in which the unit for pressurising (UP) a liquid comprises at least the following:
    a reservoir (R1, R2) capable of resisting internal pressures of over $5 \times 10^5$ Pa and designed to contain the liquid to be pressurised, said reservoir (R1, R2) being combined with at least a first outlet pipe (14, 14') with a valve (V5, V7) for liquid pressurised in the duct (20), and with a first inlet pipe (10, 10') with valve (V6, V8) for feeding liquid into the reservoir (R1, R2), and a means of heating.

Said plant is essentially characterised in that the means of heating is a heating element with the combustion of fossil fuels, wood biomass or other element, designated CF, or a heating element of the concentrating solar type designated CS (FIGS. 4 and 10) for producing superheated steam, in that the reservoir (R1, R2) is also combined with a second inlet pipe (16, 16') for feeding a superheated steam into the reservoir (R1, R2) via a feed duct (23) connecting the superheated steam production system to the second inlet pipe (16, 16') of the reservoir, and in that the reservoir or reservoirs (R1, R2) comprise(s) an isolated float piston element (K, FIG. 9) capable of floating on the surface of the liquid present in the reservoir considered (R1, R2). This of interest in preventing condensation of the superheated steam in contact with the liquid.

Advantageously the isolating element (K) covers more than 90%, advantageously more than 99%, of the surface of the liquid in the reservoir (R1, R2). The isolating element preferably covers essentially the entire free surface of the liquid in the reservoir, thus playing the role of a kind of isolating piston. The isolating element comprises, for example, a low density rigid foam with closed cells. The isolating element may also comprise a series of separate isolating elements capable of floating on the surface of the liquid. This series of floating elements may then form either an isolating bed or an isolating seal around one central isolating element.

Preferably the reservoir or reservoirs have an elongated shape and are combined with a float with an elongated shape capable of floating on the surface of the liquid present in the reservoir, said float being adapted to define in a reservoir considered an upper part adapted to receive essentially only superheated steam, and possibly condensation liquid deriving from the superheated steam, and a lower part adapted to receive essentially the liquid deriving from the Pelton turbine, the upper part being provided with at least one insulation.

The present invention therefore relates to a power plant of simple design which is capable of guaranteeing high efficiency in converting to electrical energy, particularly a power plant whose calories derive from the combustion of waste from wood, vegetable oil or other materials, or also a thermodynamic solar power plant.

For a clearer explanation of the object of the invention information will be given below on the Pelton turbine used for high waterfalls for over 100 years throughout the world. The Pelton hydraulic turbine is ideal for equipping high waterfalls ranging from 30 m to over 1,000 m. The Pelton turbine has numerous advantages for converting the energy from such waterfalls; in particular it has very high efficiencies exceeding 90%.

For a clearer understanding of this invention it is useful to summarise the main parameters of a Pelton turbine used with a waterfall.

Therefore let us assume a water aquifer at a height H (see FIG. 1) relative to the nozzle of the Pelton turbine. The nozzle directs the water at high speed towards spoon-shaped buckets, also known as impulse blades, which are mounted around the circumferential rim of a drive wheel—also called a runner.

The nozzle converts the pressure energy in the pipe to kinetic energy. From the nozzle (FIG. 1) the speed $C_1$ is equal to:

$$C1 = \sigma_1 \sqrt{2gH} \ (m/s)$$

$\sigma_1$: coefficient of efficiency of the nozzle, generally $\sigma_1 = 0.975$ g: 9.81 m/s².

H: difference in level in meters.

By way of example H=400 m gives a speed $C_1$:

$$C_1 = 0.975 \sqrt{29.81400} = 86.37 \ m/s.$$

The efficiency $\eta_{Pelton}$ of Pelton turbines may be as much as 0.9170.

To understand the invention the operation of a conventional power plant will be described very briefly. Most power plants from to 1,000 MW and over, whether solar, nuclear, coal, wood biomass, etc., use the Rankine steam cycle (FIG. 2). The superheated steam under high pressure (point A FIG. 2) is conventionally expanded in a steam turbine. This polytropic expansion is represented by curve AB in the Rankine graph (FIG. 2). The efficiency of this expansion varies from 0.7 for the small plants of 1 to 2 MW to as much as 0.85 for the large plants of over 50 MW. In this case the expansion takes place in a multi-stage turbine, frequently more than 15 stages and with numerous intermediate reheating stages. The present invention also advantageously uses a Rankine cycle for producing the steam superheated under pressure. Said steam is fed to a cylinder filled with water. The water contained in cylinder R1, pressurised by said steam, is then used to supply the nozzle of the Pelton P (FIG. 4).

As a result of the interaction of two cylinders R1, R2 and a reservoir R3 the Pelton P can easily be supplied with liquid content continuously (FIG. 4).

The quantity of steam admitted into cylinder R1 will be controlled by valve V2 (FIG. 4). The steam superheated at pressure Pa is then expanded from pressure Pa to pressure Pb (FIG. 2).

Cylinder R1 will be thermally insulated to ensure that expansion A B is as isentropic as possible. For example, of the pressure of superheated steam decreases from $50 \times 10^5$ Pa to $30 \times 10^5$ Pa, the Pelton turbine will be advantageously dimensioned for a pressure of $40 \times 10^5$ Pa as its nominal peak.

Under these conditions the efficiency of the Pelton will increase successively from 90% to 91.7%, then return to 90%.

Within this range from $50 \times 10^5$ Pa to $30 \times 10^5$ Pa, the mean efficiency of the Pelton turbine is 90.85%.

If the calorific losses of cylinder C1 (FIG. 4) are low, the mean efficiency of the expansion will far exceed the efficiency of the expansion of a conventional "steam turbine".

If it is required to continue the expansion of the steam and maintain high efficiency of the machine, a second Pelton is necessary.

The second Pelton will allow a steam expansion from $30 \times 10^5$ Pa to $16.87 \times 10^5$ Pa. The second Pelton will advantageously be designed for $22.5 \times 10^5$ Pa, and so on with a third Pelton, etc. until a residual pressure is obtained that is acceptable for the global efficiency of the plant. A very high average efficiency can therefore be maintained throughout the expansion of the steam. As example only, FIG. 3 shows the graph f development of the efficiency using two Pelton turbines with a pressure variation from $50 \times 10^5$ Pa to $16.87 \times 10^5$ Pa.

The invention therefore relates to a thermal or thermodynamic solar plant based on a thermodynamic cycle, advantageously a cycle at least essentially equivalent to a Rankine steam cycle to generate a liquid under pressure, combining (a) at least one Pelton turbine for converting the energy of the liquid under pressure to a mechanical energy, and (b) at least one generator or alternator for converting the mechanical energy to an electrical energy.

The invention relates to a power plant comprising:
(a) a unit for pressurising a liquid,
(b) a Pelton turbine comprising a rotating shaft,
(c) a duct connecting the pressurisation unit to the Pelton turbine for feeding the pressurised liquid to the Pelton turbine, said duct being fitted with at least one injector (in this present document an injector is understood to mean a system channeling the liquid deriving from the duct to give it a high discharge speed. A nozzle, for example, is such an injector), and
(d) a generator, advantageously an alternator, capable of being driven by the rotating shaft of the turbine, advantageously with the interposition of a gear system, for example when the speed of rotation of the Pelton shaft is different from the speed of synchronism of the alternator.

More specifically, the invention relates to a power plant selected from the group consisting of thermal and solar thermodynamic power plants based on a thermodynamic cycle, for generating an energy derived from a liquid under pressure, said plant combining: —at least one Pelton turbine adapted for converting the energy derived from the liquid under pressure to a mechanical energy, and—at least one converting system selected from the group consisting of generators and alternators adapted for converting at least partly the said mechanical energy into an electrical energy, said power station comprising:
(a) at least one unit for pressurising a liquid into a liquid under pressure, said unit (UP) being adapted for generating an energy derived from the liquid under pressure,
(b) at least one Pelton turbine (P) comprising each a rotating shaft,
(c) at least one duct system (20) connecting the at least one pressurisation unit to at least one considered Pelton turbine (P) of said at least one Pelton turbine, the said duct system being adapted for feeding the at least one considered Pelton turbine with liquid under pressure through at least one injector fitted on the said at least one duct system (20), so as to drive into rotation the rotating shaft of the said at least one considered Pelton turbine, and
(d) the at least one converting system selected from the group consisting of generators and alternators adapted for converting at least partly the said mechanical energy into an electrical energy, the said at least one converting system having a shaft connected to at least one rotating shaft of the said at least one considered Pelton turbine, though a connecting system selected from the group consisting of connecting system adapted for direct driving the shaft of the at least one converting system by at least one rotating shaft of the said at least one considered Pelton turbine and connecting system adapted for driving the shaft of the at least one converting system by at least one rotating shaft of the said at least one considered Pelton turbine with interposition of at least a gear system, in which the at least one unit for pressurising the liquid (UP) into the liquid under pressure comprises at least:
at least one reservoir (R1, R2) suitable for resisting internal pressures of over $5 \times 10^5$ Pa and designed to contain the liquid to be pressurised and thus the liquid under pressure, each considered reservoir of said at least one reservoir (R1, R2) being combined with at least a first outlet pipe (14, 14') with a valve (V5, V7) for conducting the liquid under pressure in the duct (20), and a first inlet pipe (10, 10') with a valve (V6, V8) for feeding liquid into the considered reservoir (R1, R2), and a heating means selected among the group consisting of a heating element burning combustible material (CF), a heating element of the concentrating solar type, a heating element of the thermodynamic solar type (CS) and a combination thereof, for producing superheated steam under pressure, in which each considered reservoir of the at least one reservoir (R1, R2) is also combined with a second inlet pipe (16, 16') for feeding a superheated steam in the considered reservoir (R1, R2) via a supply duct (23) connecting the heating means (CF,CS) for producing superheated steam to the second inlet pipe (16, 16') of the considered reservoir (R1,R2), and in which each considered reservoir of the at least one reservoir (R1, R2) comprises an insulated floating piston element (K) designed to float on the surface of the liquid present in the considered reservoir (R1, R2).

Particularities and details of advantageous, and even preferred embodiments of power plants of the invention are given hereafter, preferred embodiments combining several of said particularities and details:

The power plant is selected from the group consisting of thermal and solar thermodynamic power plants based on a thermodynamic cycle at least essentially equivalent to a Rankine steam cycle; and/or for each considered reservoir (R1,R2) containing liquid with an upper surface, the insulated floating piston element (K) is designed to cover more than 90% of the upper surface of the said liquid present in the considered reservoir (R1,R2); and/or for each considered reservoir (R1,R2) containing liquid with an upper surface, the insulated floating piston element (K) is designed to cover more than 99% of the upper surface of the said liquid present in the considered reservoir (R1,R2); and/or the Pelton turbine is associated to a collecting system for collecting water deriving from the Pelton turbine, said collecting system (FR) being connected to each reservoir by a return duct (21) for returning liquid from the collecting system (FR) to the reservoir (R1,R2); and/or each considered reservoir of the at least one reservoir (R1,R2) has an elongated shape and is associated to the insulated floating piston element (K) designed to float on the upper surface of the liquid present in the considered reservoir (R1,R2), said insulated floating piston element (K) being adapted to define in the considered reservoir (R1,R2) an upper part adapted to receive essentially the superheated steam from the heating means (CS,CF) via the supply duct (23), and a lower part adapted to receive essentially liquid deriving from the collecting system (FR) through the return duct (21), wherein at least the upper part is provided with at least one insulation layer. (see FIG. 11 outer insulation layer, even if an inner insulation layer is possible) The lower part of the reservoir (R1,R2) is possibly not thermally insulated, as said part is not in contact with the superheated steam. The piston can have a sufficient height so that despite the piston stroke the top of the insulated piston is still within the insulated upper part of the reservoir; and/or each considered reservoir of the at least one reservoir (R1,R2) has an elongated shape and is associated to the insulated floating piston element (K) designed to float on the upper surface of the liquid present in the considered reservoir (R1,R2), said insulated floating piston element (K) being adapted to define in the considered reservoir (R1,R2) an upper part adapted to receive essentially the superheated steam from the heating means (CS,CF) via the supply duct (23) and condensation liquid deriving from the superheated steam, and a lower part adapted to receive essentially liquid deriving from the collecting system (FR) through the return duct (21), wherein at least the upper part is provided with at least one insulation layer; and/or the upper part and the lower part of each reservoir (R1,R2) are attached to each other with the interposition of an insulating layer M, having the form for example of ring, an O-ring. (see FIG. 11); and/or the upper part and the lower part of each reservoir (R1,R2) are attached to each other with the interposition of an insulating layer or ring M, whose free edge (for example its circular edge or inner flange) pointing inwardly the reservoir (R1,R2) is designed to touch an outer wall of the insulated floating piston element (K). Said insulating layer or ring ensuring a kind of sealing between the inner face of the reservoir and the outer face of the piston (see FIG. 11); and/or each considered reservoir (R1, R2) is thermally insulated to enable an expansion selected from the group consisting of polytropic expansion and essentially isentropic expansion of the superheated steam introduced in the considered reservoir; and/or each reservoir (R1, R2) is also combined with a second outlet pipe (12, 12') for discharging steam present in the reservoir (R1, R2), wherein said second outlet pipe (12, 12') is combined with a valve (V1, V4). Such a discharge is useful for depressurising the reservoir when refilling it with liquid for a new cycle; and/or The power plant comprises (a) at least one set of four reservoirs (R1, R2 and R'$_1$, R'$_2$) adapted to receive superheated steam under a pressure of over $5\times10^5$ Pa (particularly over $20\times10^5$ Pa, even much more, for example $40\times10^5$ Pa, $50\times10^5$ Pa, $75\times10^5$ Pa, $100\times10^5$ Pa, $140\times10^5$ Pa or even more depending on the pressure of the superheated steam) deriving from the heating element (CF,CS) and adapted to contain liquid under pressure intended for the Pelton turbine (P) (i.e. for driving into rotation the Pelton turbine), and (b) a control system for the reservoirs for controlling the outflow of liquid under pressure from the reservoirs, so as to feed liquid under pressure to the Pelton turbine so that the converting system is able to generate an electrical energy that is essentially stable for at least one hour, such as from 1 to 12 hours or even more); and/or The power plant comprises (a) at least one set of four reservoirs that are essentially identical (R1, R2 and R'$_1$, R'$_2$) adapted to receive steam under a pressure of over $5\times10^5$ Pa (particularly over $20\times10^5$ Pa, even much more, for example $40\times10^5$ Pa, $50\times10^5$ Pa, $75\times10^5$ Pa, $100\times10^5$ Pa, $140\times10^5$ Pa or even more depending on the pressure of the superheated steam) deriving from the heating element (CF,CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is essentially stable for at least one hour. (such as from 1 to 12 hours or even more); and/or The second outlet pipe (12, 12') for discharging steam present in a reservoir (for reducing the pressure inside the reservoir) is connected to a duct (22) feeding the discharged steam into a condenser (C) adapted to convert the discharged steam to a liquid, wherein said condenser (C) is connected by a duct (24) comprising a pumping means (P1) for feeding the liquid deriving from the converting of discharged steam in a liquid to the heating means of the pressurised unit (UP) for producing superheated steam from said liquid. This is advantageous as enabling to save energy and to have less water loss in the cycle for producing and using superheated steam. The energy from the condensation of steam can be advantageously recovered for use for purposes of drying, cooking, heating buildings, etc. This is called co-generation. This enables the efficiency of the system to be improved and part of the energy from the steam is recovered. Liquid sent to the heating system can still have a temperature of 70-100° C., whereby the heating system needs less energy for producing superheated steam; and/or The power plant comprises at least one first reservoir (R1) and a second reservoir (R2) mounted in parallel, wherein each of said reservoirs (R1, R2) is designed to resist inner pressures of over $5\times10^5$ Pa (particularly over $20\times10^5$ Pa, even much more, for example $40\times10^5$ Pa, $50\times10^5$ Pa, $75\times10^5$ Pa, $100\times10^5$ Pa, $140\times10^5$ Pa or even more depending on the pressure of the superheated steam) and to contain the liquid to be pressurised, wherein each reservoir (R1, R2) is combined:
  with at least one first outlet pipe (14, 14') with a valve (V5, V7) for liquid under pressure from the reservoir,
  with a second outlet pipe (12, 12') for discharging steam present in the reservoir considered, wherein the second outlet pipe (12, 12') is combined with a valve (V1, V4),
  with a first inlet pipe (10, 10'), with a valve (V6, V8) for feeding liquid into the reservoir considered (R1, R2), and
  with a second inlet pipe (16, 16') for feeding a superheated steam into the reservoir considered (R1, R2); and/or The power plant comprises at least one collector (FR) adapted to recover liquid after acting on the Pelton turbine (P), wherein said collector (FR of R3) is essentially at a higher level relative to at least one reservoir (R1, R2) to allow filling of the at least one reservoir (R1, R2) with liquid flowing from the collector (FR) by the force of gravity via a duct (21) extending between said collector (FR) and said first inlet pipe (10, 10') of the reservoir, whereby a first closed circuit for the liquid is formed between the Pelton turbine (P) and the at least one reservoir (R1, R2). This enables the consumption of additional liquid (water) to be reduced, prevented or even eliminated; and/or The heating means (CS,CF) for producing the superheated steam (CS, CF) and the at least one reservoir (R1, R2) form a second closed circuit with the condenser (C) and the pumping system (P1). This enables also to reduce, prevent or eliminate substantially all consumption of additional liquid for producing superheated steam; and/or The power plant comprises a series of twinned reservoirs (R1, R2) adapted to supply a series of Pelton turbines (P), each of which is adapted to the efficiency close to the optimum, whose shafts drive via a gear train the same converting system; and/or The power plant is adapted to work with an aqueous medium as liquid, and with water superheated steam as superheated steam. The two circuits are substantially totally independent; and/or the liquid (for the liquid circuit comprising the Pelton turbine) is an aqueous medium containing more than 90% by weight of water (advantageously substantially only water), whilst the superheated steam (for pressurising the liquid comprised in a container) is a steam consisting more than 90% by volume of water superheated steam under pressure (advantageously substantially only superheated water vapour or steam). With the two circuits substantially independent and closed, in one or the other case, the water consumption is strictly zero or near zero in both circuits; and/or The power plant comprises a condenser (C) of steam discharged from the at least one reservoir (R1, R2), wherein said condenser (C) comprises a heat exchange element in which a fluid circulates to ensure the condensation of the steam to a liquid, said heat exchange element of the condenser (C) being adapted to be connected to an exchanger enabling heat derived from the condensation to be use in cogeneration; and/or The power plant is adapted to operate at superheated steam under pressure over $10 \times 10^5$ Pa (particularly over $20 \times 10^5$ Pa, even much more, for example $40 \times 10^5$ Pa, $50 \times 10^5$ Pa, $75 \times 10^5$ Pa, $100 \times 10^5$ Pa, $140 \times 10^5$ Pa or even more depending on the pressure of the superheated steam), and with temperature of between 110° C. and 600° C.; and/or The power plant is adapted to operate with water superheated steam pressurised over $50 \times 10^5$ Pa (particularly over $75 \times 10^5$ Pa, $100 \times 10^5$ Pa, $140 \times 10^5$ Pa or even more depending on the pressure of the superheated steam) with temperature exceeding 150° C.

The invention also relates to the use of a power plant according to the invention to produce electrical energy from superheated steam, in which the superheated steam pressurises a liquid in a reservoir, and in which the pressurised liquid is fed to the Pelton turbine to drive it in rotation so as to drive in rotation the shaft of a generator, advantageously an alternator, to generate the electrical energy.

The production of superheated steam is also advantageously carried out by a solar system, particularly a concentrating solar plant.

The process according to the invention is therefore a process in which a superheated steam, advantageously a superheated water vapour, is produced, this superheated steam is fed into a reservoir containing a liquid to pressurise it, and the pressurised liquid is fed to at least one Pelton turbine to drive at least one generator or alternator to produce electrical energy.

In the electrical energy production process according to the invention at least one set of essentially identical reservoirs is advantageously used (R1, R2 and R'1 and R'2) for pressurising a liquid by means of superheated steam, and the cycle of filling and draining a pair of reservoirs R1, R2 and that of another pair of reservoirs R'1, R'2 offset to each other so that the supply of steam, under pressure and deriving from the boiler is continuously controlled without interruption.

More specifically the process of the invention is a process for the production of electrical energy using a power plant selected from the group consisting of thermal and solar thermodynamic power plants based on a thermodynamic cycle, for generating an energy derived from a liquid under pressure, said plant combining: —at least one Pelton turbine adapted for converting the energy derived from the liquid under pressure to a mechanical energy, and—at least one converting system selected from the group consisting of generators and alternators adapted for converting at least partly the said mechanical energy into an electrical energy, said power station comprising:

i. at least one unit for pressurising a liquid into a liquid under pressure, said unit (UP) being adapted for generating an energy derived from the liquid under pressure, ii. at least one Pelton turbine (P) comprising each a rotating shaft, iii. at least one duct system (20) connecting the at least one pressurisation unit to at least one considered Pelton turbine (P) of said at least one Pelton turbine, the said duct system being adapted for feeding the at least one considered Pelton turbine with liquid under pressure through at least one injector fitted on the said at least one duct system (20), so as to drive into rotation the rotating shaft of the said at least one considered Pelton turbine, and iv. the at least one converting system selected from the group consisting of generators and alternators adapted for converting at least partly the said mechanical energy into an electrical energy, the said at least one converting system having a shaft connected to at least one rotating shaft of the said at least one considered Pelton turbine, though a connecting system selected from the group consisting of connecting system adapted for direct driving the shaft of the at least one converting system by at least one rotating shaft of the said at least one considered Pelton turbine and connecting system adapted for driving the shaft of the at least one converting system by at least one rotating shaft of the said at least one considered Pelton turbine with interposition of at least a gear system, in which the at least one unit for pressurising the liquid (UP) into the liquid under pressure comprises at least:

at least one reservoir (R1, R2) suitable for resisting internal pressures of over $5 \times 10^5$ Pa and designed to contain the liquid to be pressurised and thus the liquid under pressure, each considered reservoir of said at least one reservoir (R1, R2) being combined with at least a first outlet pipe (14, 14') with a valve (V5, V7) for conducting the liquid under pressure in the duct (20), and a first inlet pipe (10, 10') with a valve (V6, V8) for feeding liquid into the considered reservoir (R1, R2), and a heating means selected among the group consisting of a heating element burning combustible material (CF), a heating element of the concentrating solar type, a heating element of the theimodynamic solar type (CS) and a combination thereof, for producing superheated steam under pressure, in which each considered reservoir of the at least one reservoir (R1, R2) is also combined with a second inlet pipe (16, 16') for feeding a superheated steam in the considered reservoir (R1, R2) via a supply duct (23) connecting the heating means (CF,CS) for producing superheated steam to the second inlet pipe (16, 16') of the considered reservoir (R1,R2), and in which each considered reservoir of the at least one reservoir (R1, R2) comprises an insulated floating piston element (K) designed to float on the surface of the liquid present in the considered reservoir (R1, R2) said process comprising the steps of:

a superheated steam under pressure is produced in the heating means;

this superheated steam under pressure is fed into at least one reservoir (R1,R2) containing a liquid so as to pressurise it and form a liquid under pressure in the said at least one reservoir, and the liquid under pressure of said at least one reservoir is fed to at least one Pelton turbine for driving the converting system to produce electrical energy.

Particularities and details of advantageous process of the invention are one or more (preferably more) of the followings:

the power plant is selected from the group consisting of thermal and solar thermodynamic power plants based on a thermodynamic cycle at least essentially equivalent to a Rankine steam cycle; and/or for each considered reservoir (R1,R2) containing liquid with an upper surface, the insulated floating piston element (K) is designed to cover more than 90% of the upper surface of the said liquid present in the considered reservoir (R1,R2); and/or for each considered reservoir (R1,R2) containing liquid with an upper surface, the insulated floating piston element (K) is designed to cover more than 99% of the upper surface of the said liquid present in the considered reservoir (R1,R2); and/or the Pelton turbine is associated to a collecting system for collecting water deriving from the Pelton turbine, said collecting system (FR) being connected to each reservoir by a return duct (21) for returning liquid from the collecting system (FR) to the reservoir (R1,R2), in which each considered reservoir of the at least one reservoir (R1,R2) has an elongated shape and is associated to the insulated floating piston element (K) designed to float on the upper surface of the liquid present in the considered reservoir (R1,R2), said insulated floating piston element (K) being adapted to define in the considered reservoir (R1,R2) an upper part adapted to receive essentially the superheated steam from the heating means (CS,CF) via the supply duct (23), and a lower part adapted to receive essentially liquid deriving from the collecting system (FR) through the return duct (21), wherein at least the upper part is provided with at least one insulation layer, whereby liquid from the collecting system is fed in the lower part of at least one reservoir; and/or the Pelton turbine is associated to a collecting system for collecting water deriving from the Pelton turbine, said collecting system (FR) being connected to each reservoir by a return duct (21) for returning liquid from the collecting system (FR) to the reservoir (R1,R2), in which each considered reservoir of the at least one reservoir (R1,R2) has an elongated shape and is associated to the insulated floating piston element (K) designed to float on the upper surface of the liquid present in the considered reservoir (R1,R2), said insulated floating piston element (K) being adapted to define in the considered reservoir (R1,R2) an upper part adapted to receive essentially the superheated steam from the heating means (CS,CF) via the supply duct (23) and condensation liquid deriving from the superheated steam, and a lower part adapted to receive essentially liquid deriving from the collecting system (FR) through the return duct (21), wherein at least the upper part is provided with at least one insulation layer; and/or the upper part and the lower part of each reservoir (R1,R2) are attached to each other with the interposition of an insulating layer; and/or the upper part and the lower part of each reservoir (R1,R2) are attached to each other with the interposition of an insulating layer, whose free edge pointing inwardly the reservoir is designed to touch an outer wall of the insulated floating piston element (K); and/or each considered reservoir (R1, R2) is thermally insulated to enable an expansion selected from the group consisting of polytropic expansion and essentially isentropic expansion of the superheated steam introduced in the considered reservoir, whereby the superheated steam fed to the at least one reservoir for pressurizing the liquid is expanded following essentially an expansion selected from the group consisting of polytropic expansion and essentially isentropic expansion; and/or each reservoir (R1, R2) is also combined with a second outlet pipe (12, 12') for discharging steam present in the reservoir (R1, R2) under pressure, wherein said second outlet pipe (12, 12') is combined with a valve (V1, V4), whereby when discharging steam present in a reservoir, the pressure inside said reservoir is reduced; and/or The process of claim 23, in which the power plant further comprises (a) at least one set of four reservoirs (R1, R2 and R'$_1$, R'$_2$) adapted to receive steam under a pressure of over 5 $10^5$ Pa (particularly over $10\times10^5$ Pa or $20\times10^5$ Pa, even much more, for example $40\times10^5$ Pa, $50\times10^5$ Pa, $75\times10^5$ Pa, $100\times10^5$ Pa, $140\times10^5$ Pa or even more depending on the pressure of the superheated steam) deriving from the heating element (CF,CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is essentially stable for at least one hour; and/or the power plant further comprises (a) at least one set of four reservoirs that are essentially identical (R1, R2 and R'$_1$, R'2) adapted to receive steam under a pressure of over $5\times10^5$ Pa deriving from the heating element (CF, CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is essentially stable for at least one hour; and/or the second outlet pipe (12, 12') for discharging steam present in a reservoir is connected to a duct (22) feeding the discharged steam into a condenser (C) adapted to convert the discharged steam to a liquid, wherein said condenser (C) is connected by a duct (24) comprising a pumping means (P1) for feeding the liquid deriving from the converting of discharged steam in a liquid to the heating means of the pressurised unit (UP) for producing superheated steam from said liquid, whereby liquid from the condenser is pumped by the pumping means into the heating means, and whereby said liquid is converted in superheated steam under pressure in said heating means; and/or The process or power plant further comprises at least one first reservoir (R1) and a second reservoir (R2) mounted in parallel, wherein each of said reservoirs (R1, R2) is designed to resist inner pressures of over $5 \times 10^5$ Pa (particularly over $20 \times 10^5$ Pa, even much more, for example $40 \times 10^5$ Pa, $50 \times 10^5$ Pa, $75 \times 10^5$ Pa, $100 \times 10^5$ Pa, $140 \times 10^5$ Pa or even more depending on the pressure of the superheated steam) and to contain the liquid to be pressurised, wherein each reservoir (R1, R2) is combined:

with at least one first outlet pipe (14, 14') with a valve (V5, V7) for liquid under pressure from the reservoir, with a second outlet pipe (12, 12') for discharging steam present in the reservoir considered, wherein the second outlet pipe (12, 12') is combined with a valve (V1, V4), with a first inlet pipe (10, 10'), with a valve (V6, V8) for feeding liquid into the reservoir considered (R1, R2), and with a second inlet pipe (16, 16') for feeding a superheated steam into the reservoir considered (R1, R2); and/or the power plant further comprises at least one collector (FR) adapted to recover liquid after acting on the Pelton turbine (P), wherein said collector (FR of R3) is essentially at a higher level relative to at least one reservoir (R1, R2) to allow filling of the at least one reservoir (R1, R2) with liquid flowing from the collector (FR) by the force of gravity via a duct (21) extending between said collector (FR) and said first inlet pipe (10, 10') of the reservoir, whereby a first closed circuit for the liquid is formed between the Pelton turbine (P) and the at least one reservoir (R1, R2); and/or The heating means (CS,CF) for producing the superheated steam (CS, CF) and the at least one reservoir (R1, R2) form a second closed circuit with the condenser (C) and the pumping system (P1), whereby reducing the loss of liquid for producing the superheated steam; and/or The power plant comprises a series of twinned reservoirs (R1, R2) adapted to supply a series of Pelton turbines (P), each of which is adapted to the efficiency close to the optimum, whose shafts drive via a gear train the same converting system; and/or An aqueous medium is used as liquid under pressure for driving the converting system, whilst water superheated steam under pressure is used as superheated steam for pressurising the liquid present in the reservoir fed to the Pelton turbine; and/or The liquid is an aqueous medium containing more than 90% by weight of water (preferably about 100% by weight water), whilst the superheated steam is a steam consisting more than 90% by volume (preferably about 100% by volume) of water superheated steam under pressure; and/or The power plant further comprises a condenser (C) of steam discharged from the at least one reservoir (R1, R2), wherein said condenser (C) comprises a heat exchange element in which a fluid circulates to ensure the condensation of the steam to a liquid, said heat exchange element of the condenser (C) being adapted to be connected to an exchanger enabling heat derived from the condensation to be use in cogeneration; and/or The process operates with superheated steam under pressure over $10 \times 10^5$ Pa, and with temperature of between 110° C. and 600° C. for pressurising liquid present in a reservoir fed to a Pelton turbine; and/or—The process operates with superheated steam under pressure over $50 \times 10^5$ Pa, and with temperature exceeding 150° C. for pressurising liquid present in a reservoir fed to a Pelton turbine; and/or at least one set of essentially identical reservoirs is used (R1, R2 and R'1 and R'2) to pressurise a liquid by means of superheated steam, and wherein the filling and draining cycle of a first pair of reservoirs (R1, R2) is combined, while another pair of reservoirs (R'1 and R'2) is offset relative to each other in order to control the supply of steam under pressure deriving from the boiler or heating system, continuously without interruption.

Particularities and advantages of preferred embodiments (given solely by way of example) will be evident from the following detailed description in which reference is made to the attached drawings.

BRIEF DESCRIPTION OF THE DRAWINGS

In these drawings.

DESCRIPTION OF PREFERRED EMBODIMENTS

Figure 4:
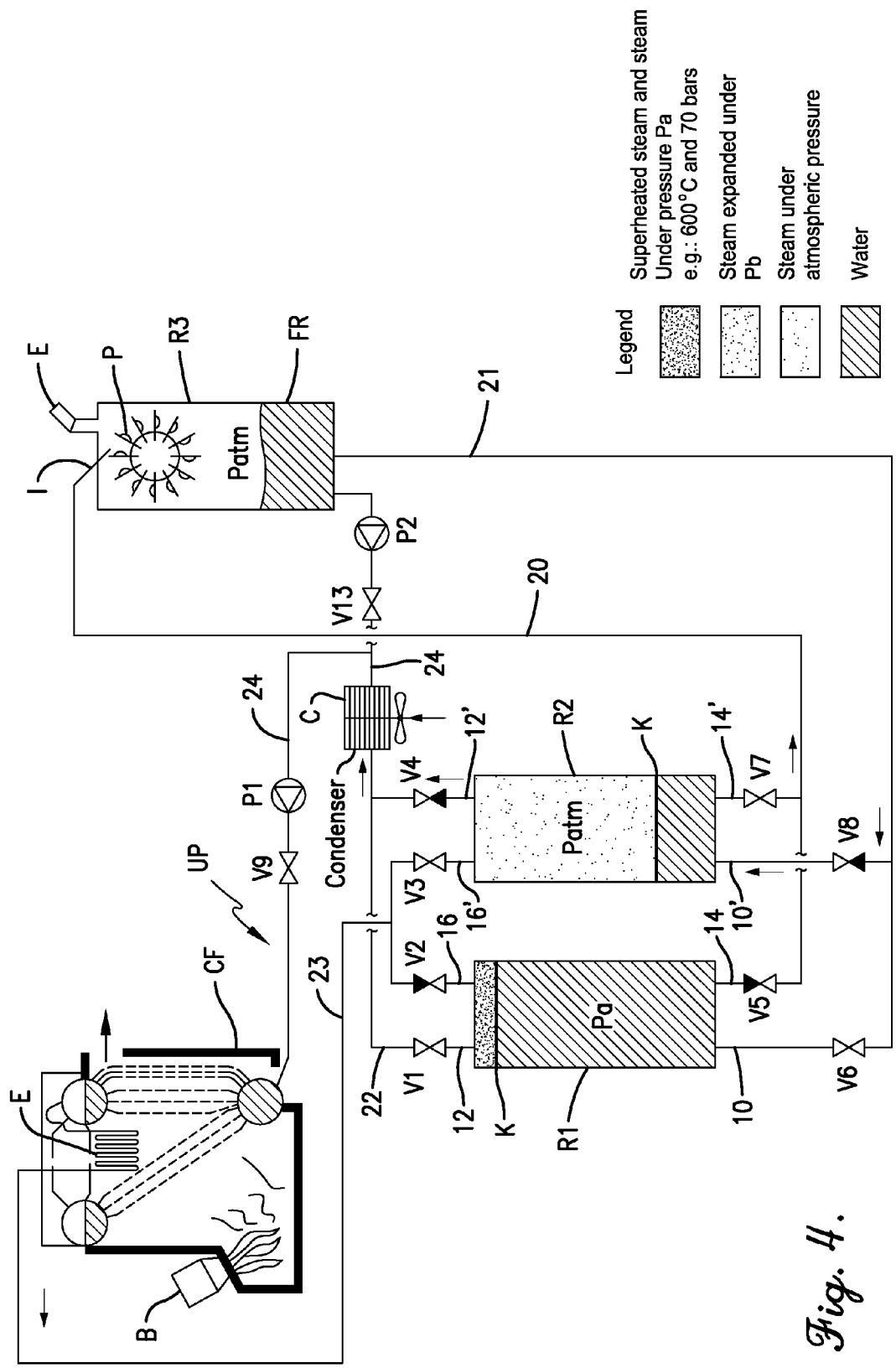
FIG. 4 is a diagrammatic view of a power plant according to the invention.

The power plant in FIG. 4 comprises:

a Pelton turbine P whose shaft is adapted to drive in rotation an alternator (not shown) via a gear device (not shown, but known as such), this turbine being fed with water under pressure by one or more injectors 1;

a reservoir 3 forming a chamber in which is housed the Pelton turbine P, said reservoir R3 comprising a vent E to ensure that the pressure in reservoir 3 is equal to atmospheric pressure, the bottom FR of the reservoir forming a collector of the water after its impact on the blades of the Pelton turbine P; bottom FR of reservoir R3 will advantageously be above reservoirs R1 and R2 so that only gravity is used to fill reservoirs R1 and R2;

a heating element CF enabling the liquid water to be converted to superheated water vapour under high pressure;

a thermal power plant CF comprising a burner B for a fuel (for example, natural gas, coal, fuel oil, wood, wood pellets, etc.), a chamber for channelling the combustion gases, a combustion gas outlet, a circuit comprising balloons and an exchanger located in the chamber for transferring calories from the combustion to the water and for converting it to superheated steam;

a series of reservoirs R1, R2 designed to receive the water to be pressurised and superheated water vapour, each reservoir R1, R2 being combined with a first inlet pipe 10, 10' with a valve V6, V8, to feed liquid into the reservoir (advantageously close to the bottom of said reservoir), a second inlet pipe 16, 16' with a valve V2, V3 for feeding superheated steam into the reservoir (advantageously close to its upper part) in order to pressurise the water present in the reservoir, a first outlet pipe 14, 14' with a valve V5, V7 for the pressurised water in the reservoir, this outlet pipe 14, 14' being adjacent to the bottom of the reservoir, and a second outlet pipe 12, 12' with valve V1, V4 for discharging steam still present in the reservoir and for feeding it to condenser C. Reservoirs R1, R2 will be advantageously provided with a thermal insulant to minimise the loss of heat from the superheated steam due to loss of heat through the walls. This thermal insulant consists, for example, of a thermal insulating coating necessarily applied to the inner faces of the reservoir.

a condenser C adapted to condense the steam deriving from a reservoir R1, R2 to form a hot liquid phase which will then be fed to the heating element CF;

a duct 20 to feed the pressurised water discharged from a reservoir via valve V5 or V7 to the injector or injectors I of Pelton turbine P;

a duct 21 connecting reservoir R3 (more exactly the water collector FR of reservoir R3) in order to refill a reservoir R1, R2 by gravity; obviously a circulation pump can be added in pipe 21;

a duct 22 connecting valves V1 and V4 to condenser C to feed the expanded steam from a reservoir R1, R2 to condenser C;

a duct 23 connecting valves V2 and V3 to heating element CF, said duct being designed to feed superheated steam to reservoirs R1, R2;

a duct 24 on which is mounted a pump P1 and valve V9 for feeding the liquid discharged from condenser C to thermal power plant CF.

The power plant comprises a "cold" circuit for the liquid water between reservoirs R1, R2 and reservoir R3, and a "hot" circuit for the superheated steam and the water from the condenser between reservoirs R1 and R2 and the thermal power plant.

The separation between the two circuits takes place at the liquid water—superheated steam interface by means of an insulating element K (FIG. 9) floating on the surface of the water of a reservoir.

This insulating element K is made from rigid foam, for example. This insulating element, during its movement in its reservoir, is capable of transmitting a signal to command the closure of valve V5, V7 when the liquid level in the reservoir is less than a predetermined level, and/or the closure of valve V2, V3 when the liquid level in the reservoir considered reaches a predetermined level.

Figure 9:
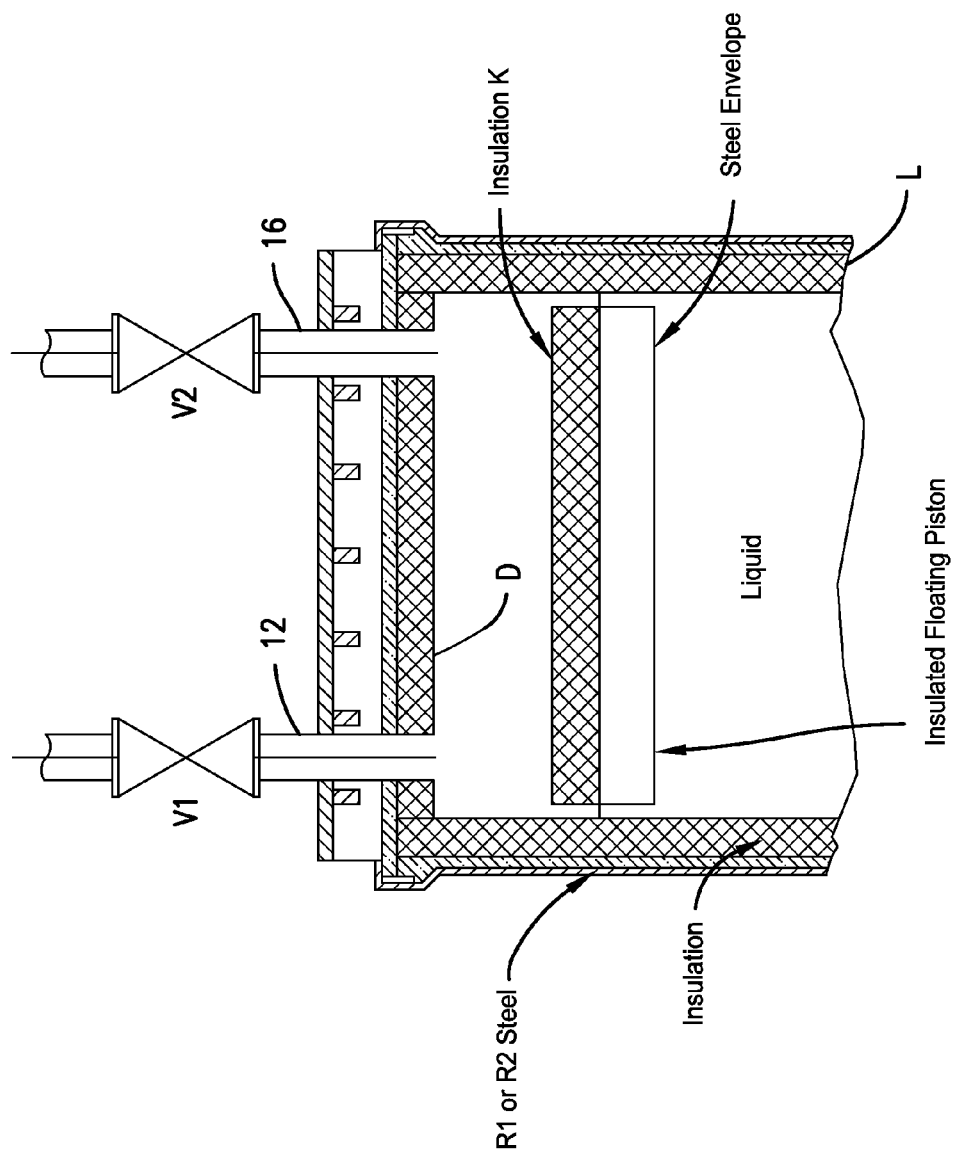
FIG. 9 is a partial sectional view of a reservoir comprising an isolating floating element (represented in cross-section)

Insulating element K in FIG. 9 has an upper flat shape which enables the dead space between insulant K and face D of the upper base of cylinder R1, R2, FIG. 9, to be minimised. As also shown in FIG. 9, reservoir R1 or R2 is insulated with a heat insulation layer L along its inner face.

Figure 5:
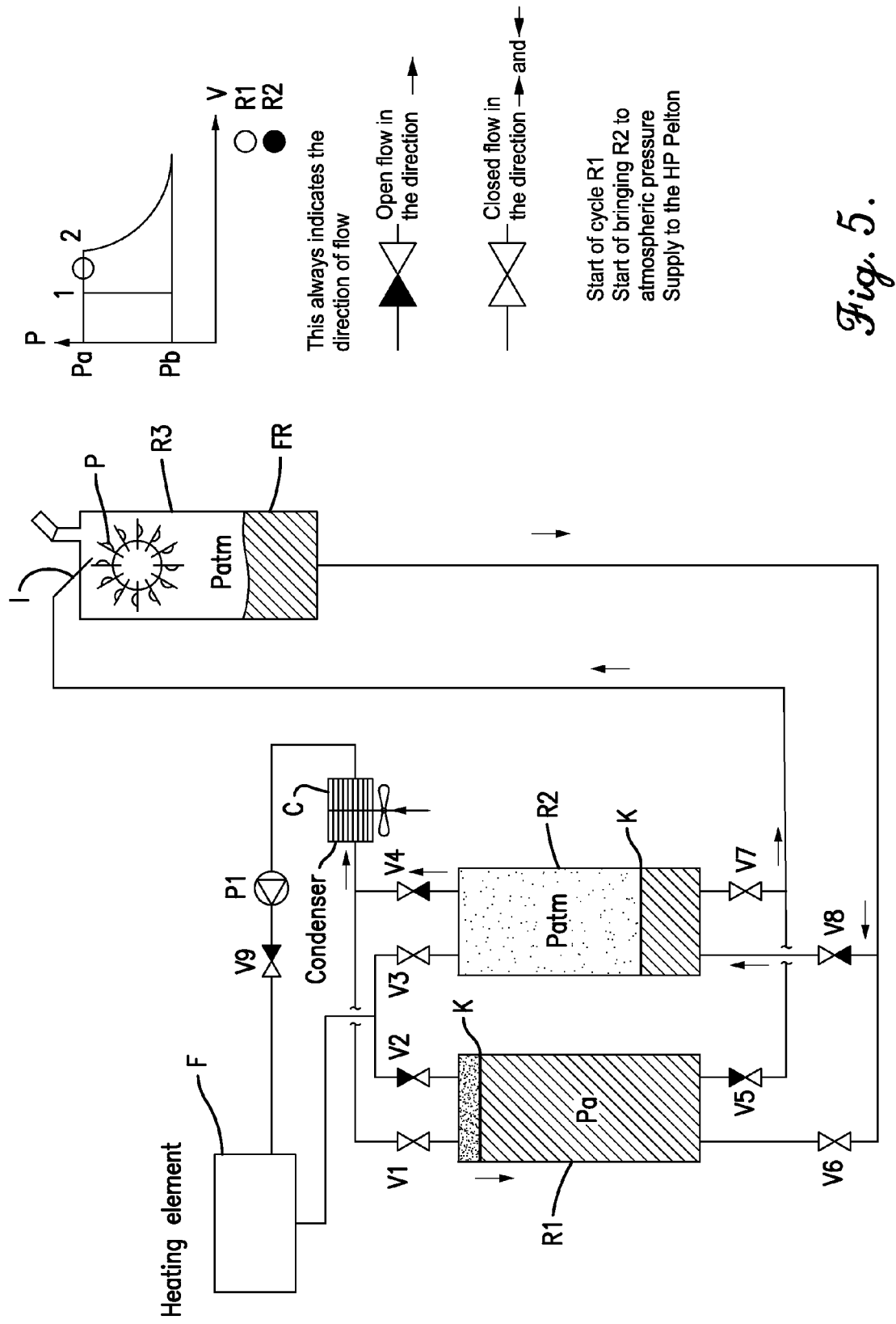
FIGS. 5 to 8 show stages of the operation of the power plant of the type shown in FIG. 4, but comprising a heating element which is conventional or solar for the production of superheated water vapour.

The thermodynamic cycle of the power plant in FIG. 4 is shown diagrammatically in FIGS. 5 to 8, but for a power plant having a heating element CF as its superheated steam source, as shown in FIG. 5; this heating element may be conventional (fuel, gas, coal, wood, oil) or solar. It is evident that the thermodynamic cycle is similar if the superheated steam is produced by the solar thermal power plant (see FIG. 10) or by a solar-thermal power plant mix.

Let us take FIG. 5 and assume the established cycle.

The superheated steam is produced at high pressure in the heating element or hot zone F. The steam superheated under high pressure is introduced via valve 2 into the dead space of reservoir R2, which is a dead space located above insulating element K. Valve V3 is in the closed position.

In the position shown in FIG. 5, reservoir R1 is designed to supply water under pressure to Pelton turbine P, whilst reservoir R2 is in the liquid water refilling phase.

For reservoir R1 valve V2 is open to allow the intake of superheated steam deriving from boiler CF, whilst valve V5 is open for the passage of pressurised water to Pelton turbine P. Valves V1 and V6 are closed.

For reservoir V2 valve 3 is closed to prevent the passage of superheated steam into reservoir R2. Valve V7 is also closed to prevent the passage of water from reservoir R1 to reservoir R2. To prevent the passage of water from one tank to another (from R1 to R2 or from R1 to R2), valves V5 and V7 are advantageously associated with a non-return system. Valve 4 is opened to allow the expanded steam still present in reservoir R2 to be discharged and to be supplied to the condenser. Valve 8 is also in the open position to allow refilling of liquid water in reservoir R2, this liquid water deriving from reservoir R3 by gravity. This introduction of water into reservoir R2 enables the water level to be raised and the steam to be driven out of reservoir R2. The pressure in the condenser is, for example, approximately $10^5$ Pa, i.e. atmospheric pressure. The operation of filling reservoir R2 with water by gravity is advantageously carried out when the pressure of the steam present in reservoir R2 is reduced, e.g. close to atmospheric pressure. The hot water deriving from condensation of the steam in condenser C is recovered and returned to the boiler via pump P1 and duct 24 (FIG. 4).

The water from reservoir R1 is pressurised, for example, to a pressure of 70 $10^5$ Pa, and is fed to one or more injectors I of Pelton turbine P.

Turbine P, driven in rotation, drives an alternator and therefore produces electrical energy. Reservoir R1 is drained of liquid water. The pressure in reservoir R1 (which corresponds essentially to the pressure of the water just upstream from the nozzle of the Pelton injector) is represented in the graph in FIG. 5. This pressure is initially maintained essentially at the pressure Pa of the superheated steam discharged from the boiler (a phase during which the quantity of superheated steam deriving from the boiler enables the pressure in reservoir R1 to be maintained, despite the discharge of liquid water to the turbine. Between point 1 and point 2 (FIG. 5), the pressure of the steam is kept constant. Valve V2 then closes and the pressure of the steam decreases according to the volume of water discharged. The pressure decreases to a residual pressure Pb. The expansion of the steam is almost isentropic in reservoir R1. This residual pressure Pb ranges, for example, from 2 to $10 \times 10^5$ Pa.

Figure 6:
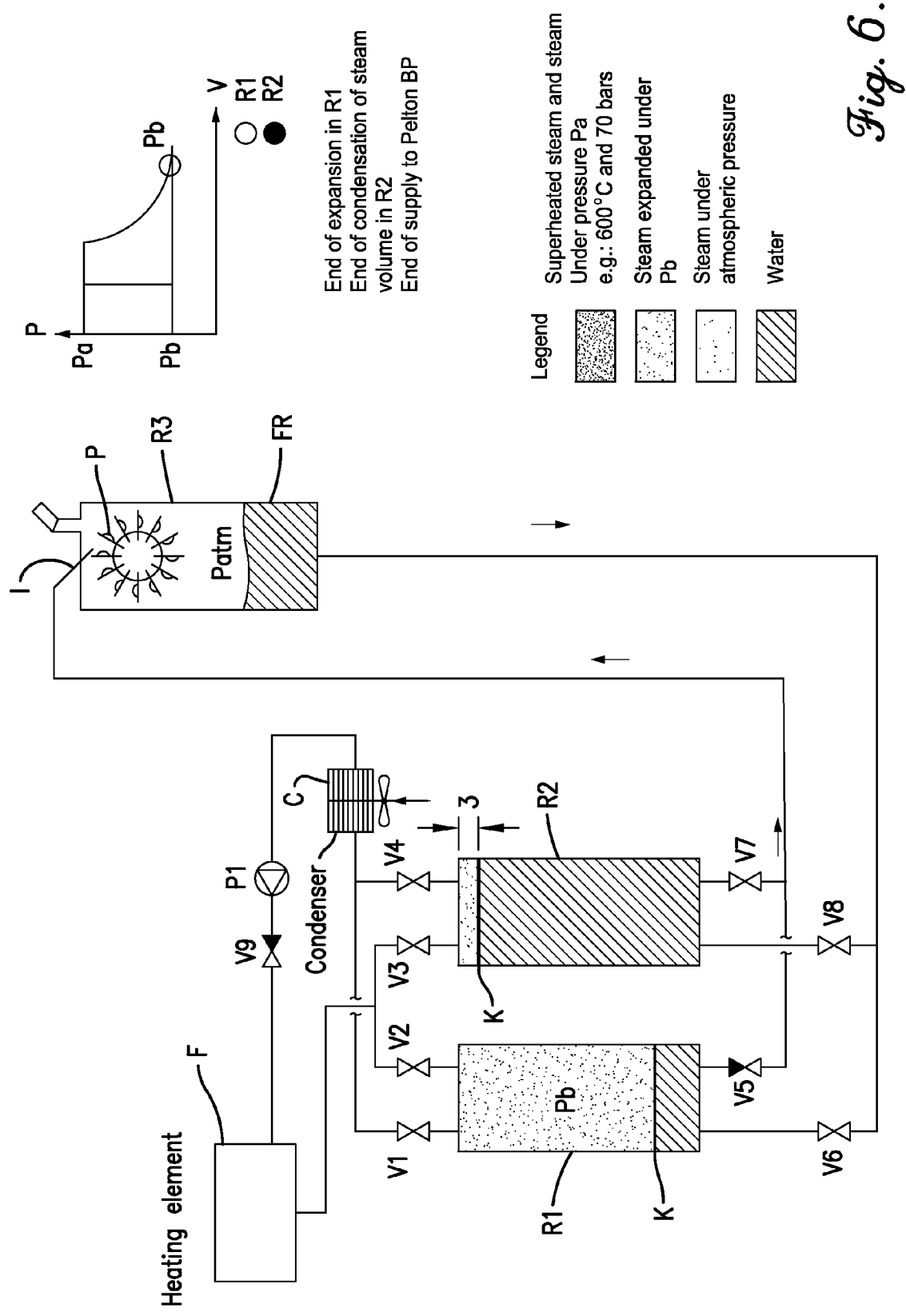

FIG. 6 shows the water level in reservoirs R1 and partial draining of R1. The water level in reservoir R1 is close to the minimum so that the supply of water deriving from R1 to turbine P will stop soon whilst the water level in reservoir R2 is at its maximum.

When the float piston arrives at the top, $\epsilon \cong 0$ (FIG. 6), valves V7 and V4 are in the closed position, whilst valve V8 is placed in the closed position, this closing being followed by the opening of valve V3 (FIG. 7) to introduce the superheated steam into reservoir R2 and increase the pressure in reservoir R2. The pressure of the water contained in reservoir R2 therefore increases from a pressure close to atmospheric pressure to a pressure Pa corresponding essentially to the pressure of the superheated water vapour.

The graph in FIG. 6 shows the pressure in reservoir R1 just before valve V5 is closed.

When valve V5 is closed, valve V7 is opened to allow the pressurised water in reservoir R2 to be displaced to Pelton turbine P to drive it in rotation. This phase is shown in FIG. 7.

At that point reservoir R1 has valves V2, V5 in the closed position. Initially valve V1 opens to bring the steam under residual pressure Pb to the pressure of the steam condenser. When the pressure of the steam in R1 has been sufficiently reduced, for example close to atmospheric pressure, valve V6 opens to feed the water in reservoir R1 deriving from reservoir R3 by gravity (by collecting the water discharged from Pelton turbine P). The water level in reservoir R1 increases, again driving the steam present in the reservoir via valve V1 to condenser C.

Figure 7:
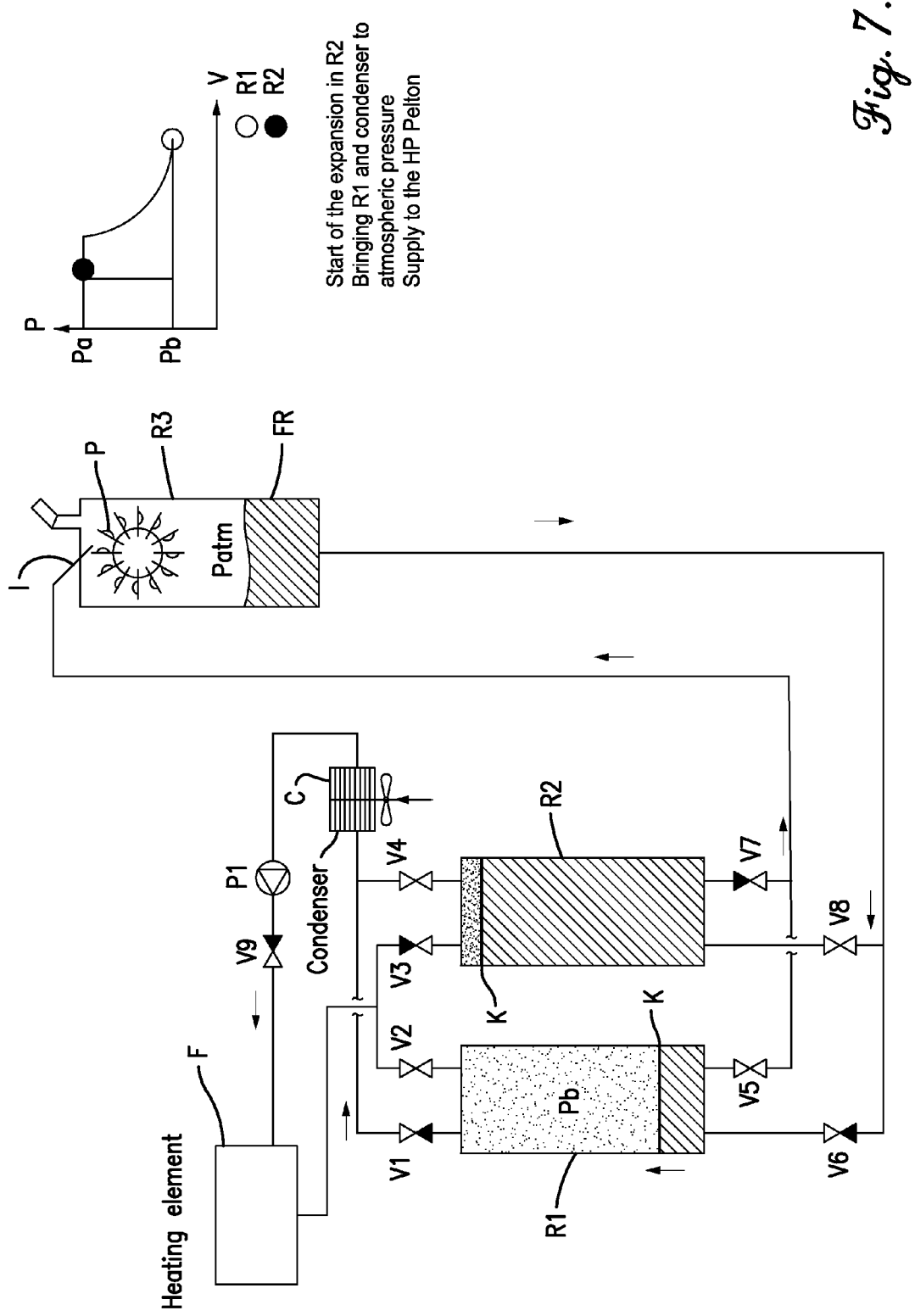
Figure 8:
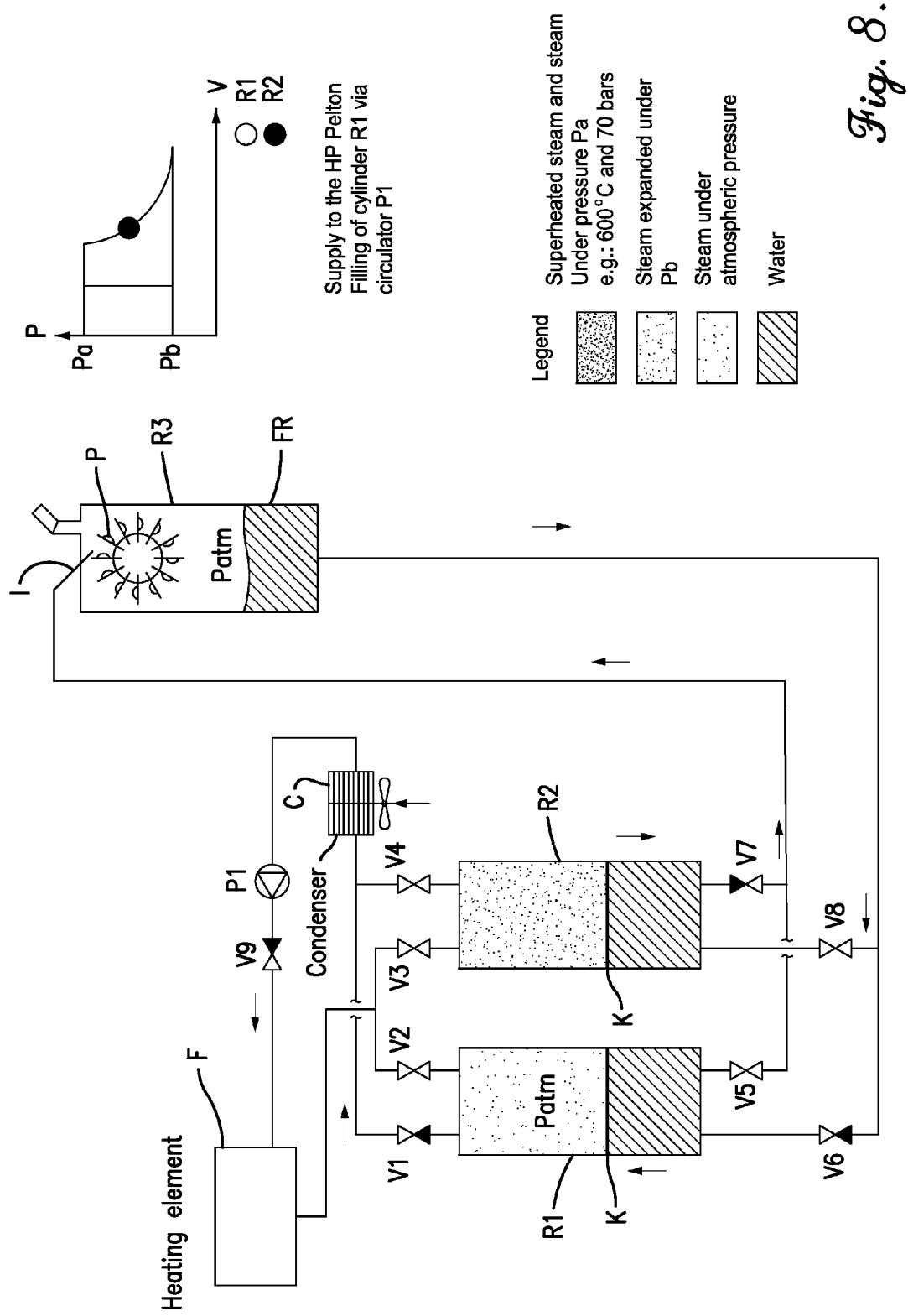

The water level in reservoir R2 decreases whilst the pressure in the reservoir remains constant during the injection of superheated steam into R2 (see FIG. 7). The graph in FIG. 7 shows the pressure in reservoir R2.

By controlling the periods of draining reservoirs R1, R2 and their pressurisation with the superheated steam it is possible to supply the Pelton turbine continuously with the pressurised water. Moreover, by adjusting the injector or injectors feeding the Pelton turbine (for example according to the pressure prevailing in the reservoir used for the supply of pressurised water), the power supplied by the Pelton turbine may be kept essentially constant.

Moreover, it has been previously observed that the pressure of the water from the reservoir used to feed the Pelton turbine P had only a minor influence on the efficiency or yield of turbine P for pressures ranging from $10 \times 10^5$ Pa to $100 \times 10^5$ Pa. The efficiency or yield of a Pelton turbine may exceed 93% for brightly finished trays. With a set of 3 Pelton turbines, a high pressure Pelton HP, a medium pressure Pelton turbine MP and a low pressure Pelton turbine MP, the loss of efficiency of the Pelton turbines may not exceed 2% of the maximum efficiency.

Figure 1:
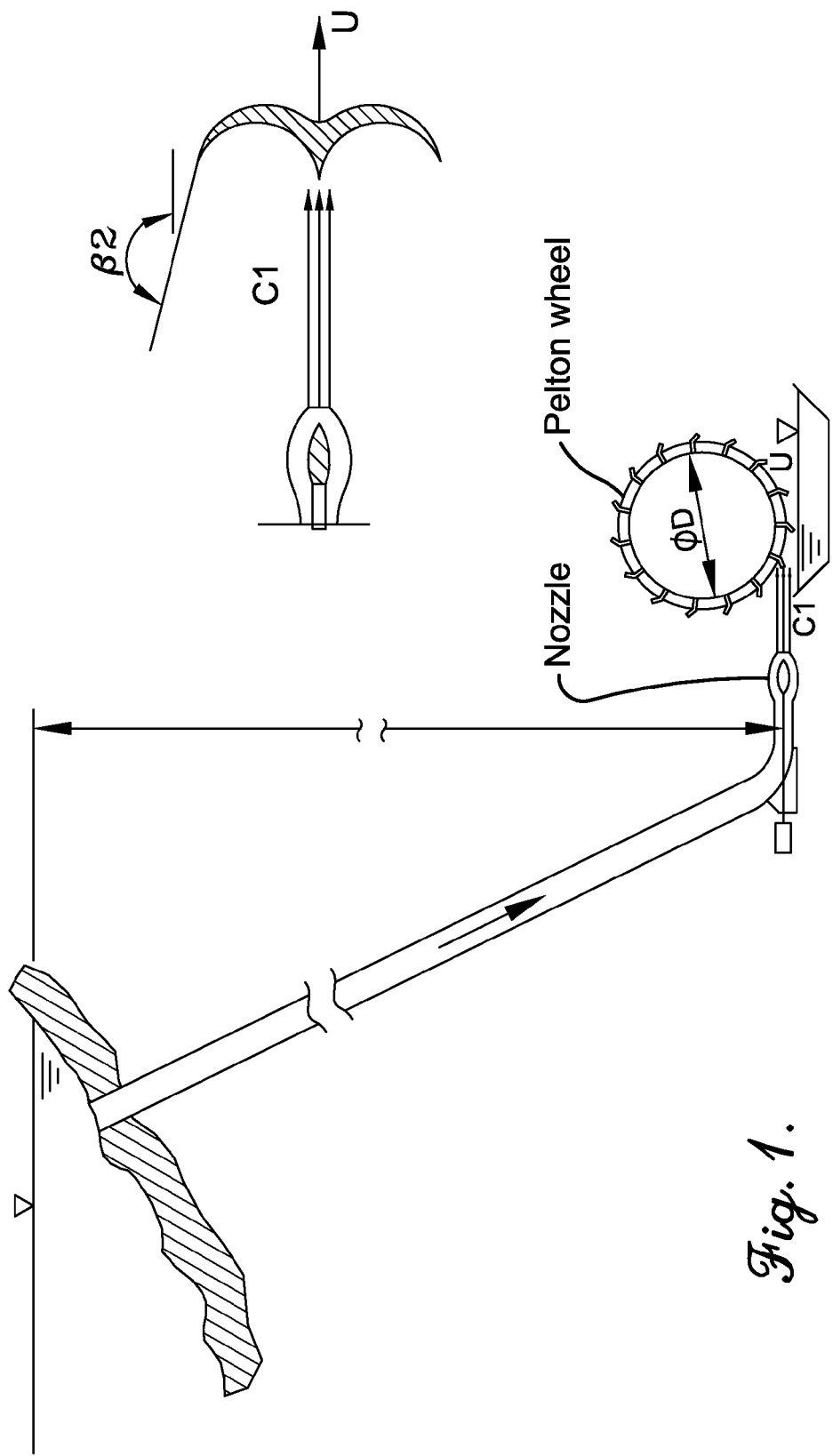
FIG. 1 is a diagrammatic view of a Pelton turbine receiving water from a barrage.
Figure 2:
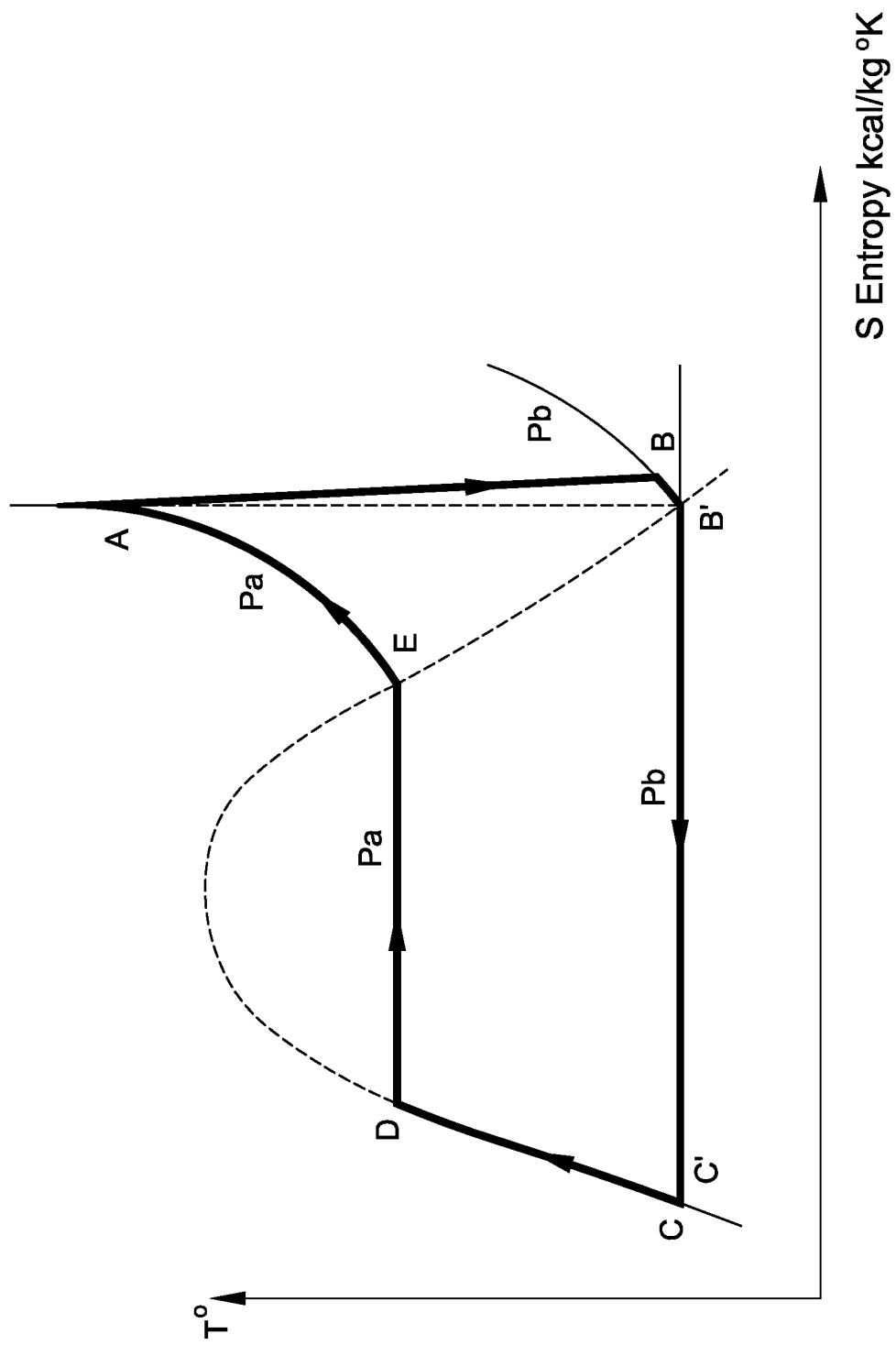
FIG. 2 is a diagram of the Rankine cycle.
Figure 3:
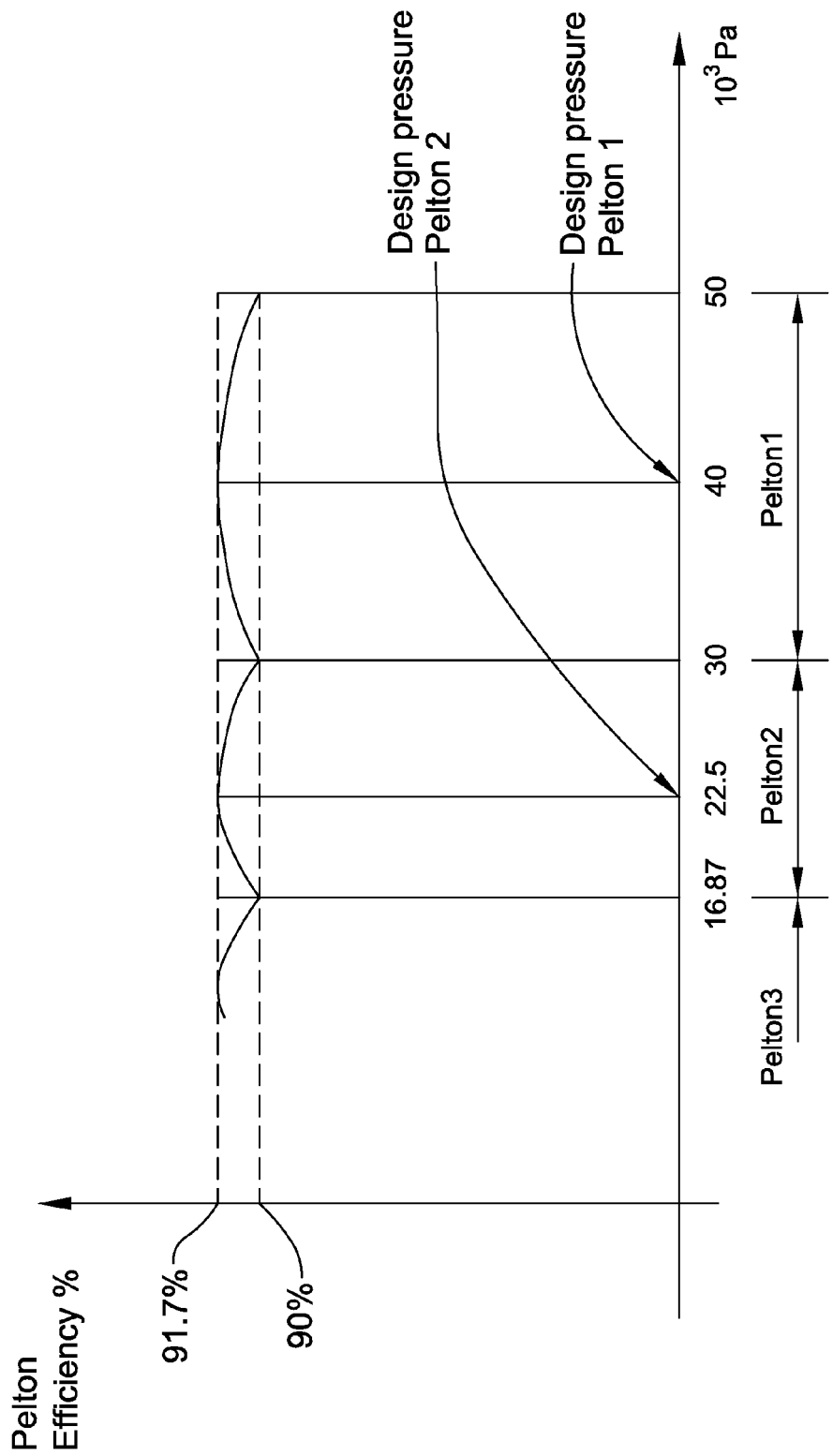
FIG. 3 is a view of the efficiency of 2 successive Peltons as a function of the pressure of the superheated water vapour.

The efficiency of the Pelton varies as shown in FIG. 3. This is of particular interest when using superheated steam deriving from a solar power plant which, by its nature, produces variable energy throughout the day.

To ensure optimum efficiency different Pelton turbines are used depending on the pressure. For example, for the expansion of steam with a pressure of $50 \times 10^5$ Pa to $30 \times 10^5$ Pa use is made of a first Pelton turbine. For the expansion of steam with pressure of $30 \times 10^5$ to $16.87 \times 10^5$ Pa a second Pelton turbine different from the first is used. Finally a third Pelton turbine is used for expansion of steam below $16.87 \times 10^5$ Pa, this third Pelton turbine being different from the first and second.

In the embodiment shown in FIG. 4, the power plant comprises only one thermal power plant CF, in particular a thermal power plant that uses wood or wood pellets, or any other fossil fuel, for producing superheated water vapour.

Such a thermal power plant enables superheated steam to be produced according to the requirements in the course of the day.

In the embodiment shown in FIG. 4 it is possible, by using two reservoirs pressured alternately by the superheated steam under pressure, and also filled alternately, to obtain a continuous electrical energy production. It is evident that more than two reservoirs could be used, for example four or more, in order to increase the power of the installation.

In the case of a cycle with buffer reservoirs R1 and R2, it is seen that the production of steam deriving from the boiler is intermittent. By combining a reservoir set $R'_1$ and $R'_2$ and by interlocking the cycles of R1 and R2 with the identical reservoirs $R'_1$ and $R'_2$, a continuous flow of steam may easily be obtained without interruption.

Figure 10:
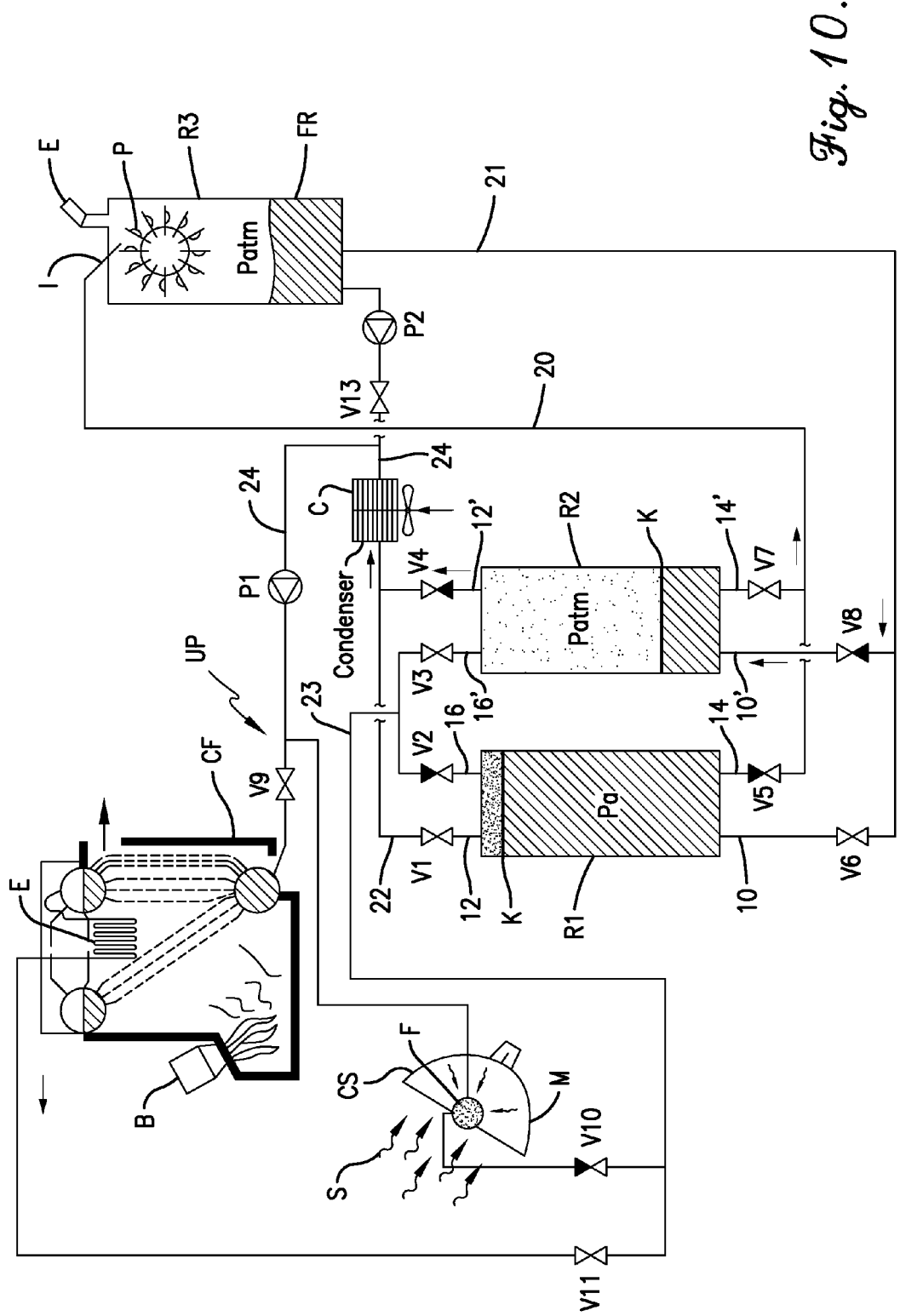
FIG. 10 is a diagrammatic view of a power plant of the type shown in FIG. 4, but comprising a wood heating element for the production of the superheated water vapour, combined with a solar heating element.
Figure 11:
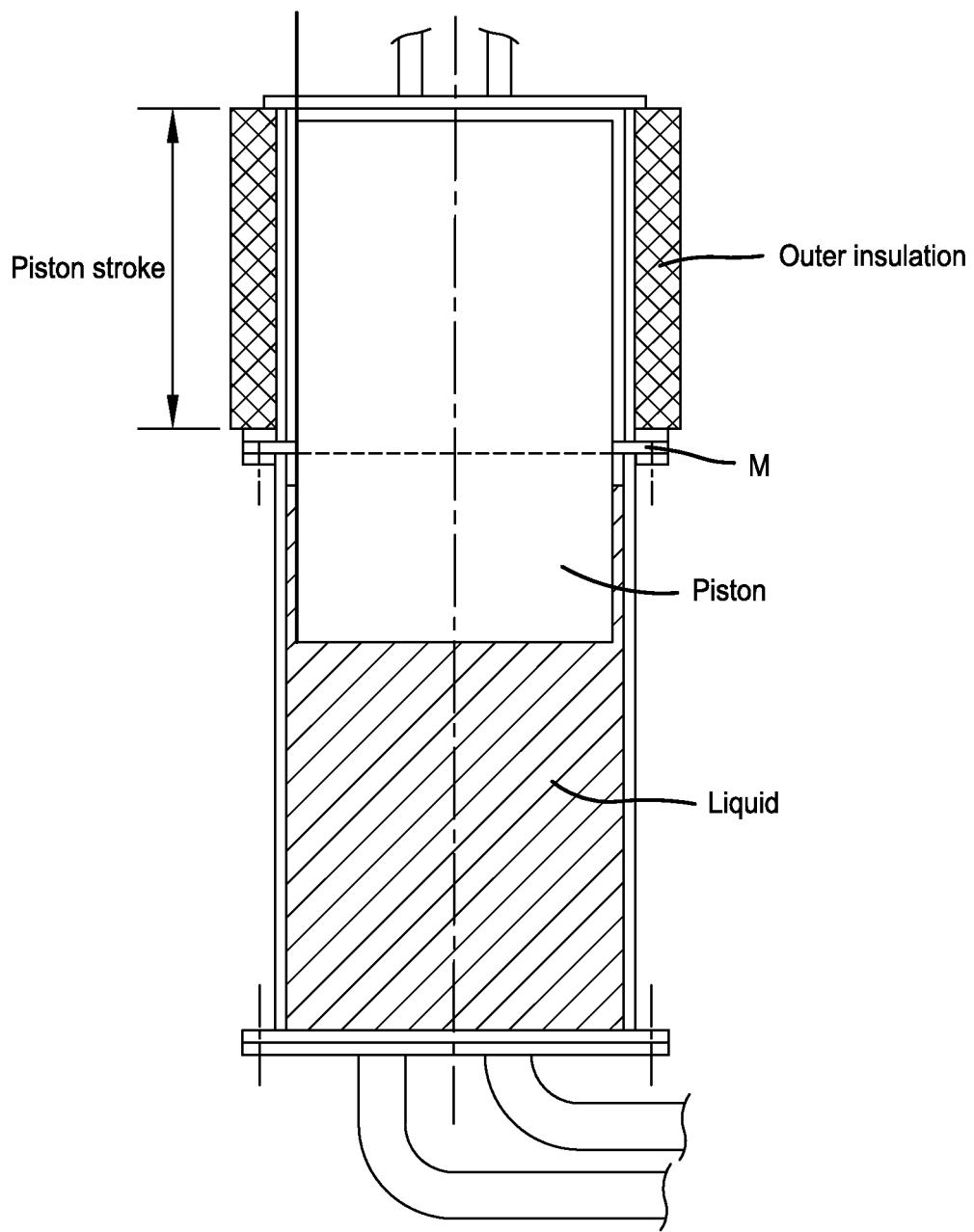
FIG. 11 is a cross-section view of a specific embodiment of a reservoir of the plant of the invention.

The power plant according to the invention is of particular interest for powers of over 250 KW, for example for powers of between 500 KW and 50 MW, thus in particular for medium power plants. It is clear that by using several Pelton turbines P in parallel, and a large number of cylinders R1, R2, the power plant according to the invention is able to produce powers exceeding 50 MW. In a concentrating solar power plant the calories used in the Rankine cycle are those produced by the sun by means of the Fresnel heliostat or parabolic mirrors. The heating element, denoted by CS, can operate in isolation. FIG. 10 shows the case of a power plant according to the invention equipped with a conventional combustion heating element, denoted by CF, twinned with a solar heating element denoted by CS. In the case of FIG. 10 the energy can be produced day and night without interruption.

It would also be interesting, from the ecological point of view, to combine the concentrating solar energy and the combustion energy of a wood chip biomass, dried tops (tomatoes, for example), etc. FIG. 10 shows such a power plant.

The power plant according to the invention is of a simple design and can easily be transported to and installed on a site of use. Moreover, in view of the circuits that are essentially closed for the pressurised water used for the Pelton turbine and for the water for the production of superheated steam, the consumption of water due to losses may theoretically be zero or in any case extremely low. Moreover, the Pelton turbine of the power plant according to the invention can use a non-demineralised water, contrary to the water used in the Rankine cycle with expansion in a steam turbine.

The power plant according to the invention has also been shown to produce little noise so that it only gives rise to a minimum level of nuisance to the nearby residents.

What I claim is:

1. A power plant selected from the group consisting of thermal and solar thermodynamic power plants based on a thermodynamic cycle, for generating an energy derived from a liquid under pressure, said power plant comprising:
    at least one unit for pressurizing a liquid into a liquid under pressure, said unit (UP) being adapted for generating an energy derived from the liquid under pressure;
    at least one Pelton turbine (P) comprising each a rotating shaft;
    at least one duct system (20) connecting said at least one pressurizing unit to said at least one Pelton turbine (P), said duct system being adapted for feeding the at least one Pelton turbine with liquid under pressure through at least one injector fitted on said at least one duct system (20), so as to drive into rotation the rotating shaft of said at least one Pelton turbine; and at least one converting system selected from the group consisting of generators and alternators adapted for converting at least partly said mechanical energy into an electrical energy, said at least one converting system having a shaft connected to at least one rotating shaft of said at least one Pelton turbine;

a connecting system selected from the group consisting of connecting system adapted for direct driving the shaft of the at least one converting system by said at least one rotating shaft of said at least one Pelton turbine and connecting system adapted for driving the shaft of the at least one converting system by said at least one rotating shaft of said at least one Pelton turbine with interposition of a gear system;

wherein said at least one unit for pressurising the liquid (UP) into the liquid under pressure comprises:

at least one reservoir (R1, R2) for resisting internal pressures of over $5 \times 10^5$ Pa and to contain the liquid to be pressurized, each reservoir of said at least one reservoir (R1, R2) being combined with at least a first outlet pipe (14, 14') with a valve (V5, V7) for conducting the liquid under pressure in the duct (20), and a first inlet pipe (10, 10') with a valve (V6, V8) for feeding liquid into the reservoir (R1, R2), and a heating means selected among the group consisting of a heating element burning combustible material (CF), a heating element of the concentrating solar type, a heating element of the thermodynamic solar type (CS) and a combination thereof, for producing superheated steam under pressure, wherein each reservoir of the at least one reservoir (R1, R2) is also combined with a second inlet pipe (16, 16') for feeding a superheated steam in the reservoir (R1, R2) via a supply duct (23) connecting the heating means (CF,CS) for producing superheated steam to the second inlet pipe (16, 16') of the reservoir (R1,R2), and wherein each reservoir of the at least one reservoir (R1, R2) comprises an insulated floating piston element (K) designed to float on the surface of the liquid present in the reservoir (R1, R2).

2. The power plant of claim 1, wherein selected from the group consisting of thermal and solar thermodynamic power plants based on a thermodynamic cycle is equivalent to a Rankine steam cycle.

3. The power plant according to claim 1, wherein for each reservoir (R1,R2) containing liquid with an upper surface, the insulated floating piston element (K) covers more than 90% of the upper surface of said liquid present in the reservoir (R1,R2).

4. The power plant of claim 1, wherein for each reservoir (R1,R2) containing liquid with an upper surface, the insulated floating piston element (K) covers more than 99% of the upper surface of said liquid present in the reservoir (R1,R2).

5. The power plant of claim 1, wherein the Pelton turbine is associated to a collecting system for collecting water deriving from the Pelton turbine, said collecting system (FR) being connected to each reservoir by a return duct (21) for returning liquid from the collecting system (FR) to the reservoir (R1,R2), wherein each reservoir of the at least one reservoir (R1,R2) has an elongated shape and is associated to the insulated floating piston element (K) designed to float on the upper surface of the liquid present in the reservoir (R1,R2), said insulated floating piston element (K) being adapted to define in the reservoir (R1,R2) an upper part adapted to receive the superheated steam from the heating means (CS,CF) via the supply duct (23), and a lower part adapted to receive liquid deriving from the collecting system (FR) through the return duct (21), wherein at least the upper part is provided with at least one insulation layer.

6. The power plant of claim 5, wherein the upper part and the lower part of each reservoir (R1,R2) are attached to each other with an interposition of the insulating layer.

7. The power plant of claim 5, wherein the upper part and the lower part of each reservoir (R1,R2) are attached to each other with an interposition of the insulating layer, wherein the interposition has a free edge pointing inwardly the reservoir to touches an outer wall of the insulated floating piston element (K).

8. The power plant according to claim 1, wherein the Pelton turbine is associated to a collecting system for collecting water deriving from the Pelton turbine, said collecting system (FR) being connected to each reservoir by a return duct (21) for returning liquid from the collecting system (FR) to the reservoir (R1,R2), wherein each reservoir of the at least one reservoir (R1,R2) has an elongated shape and is associated to the insulated floating piston element (K) designed to float on the upper surface of the liquid present in the reservoir (R1,R2), said insulated floating piston element (K) being adapted to define in the reservoir (R1,R2) an upper part adapted to receive the superheated steam from the heating means (CS,CF) via the supply duct (23) and condensation liquid deriving from the superheated steam, and a lower part adapted to receive liquid deriving from the collecting system (FR) through the return duct (21), wherein at least the upper part is provided with at least one insulation layer.

9. The power plant of claim 1, wherein each reservoir (R1, R2) is thermally insulated to enable an expansion selected from the group consisting of polytropic expansion and isentropic expansion of the superheated steam introduced in the reservoir.

10. The power plant of claim 1, wherein each reservoir (R1, R2) is also combined with a second outlet pipe (12, 12') for discharging steam present in the reservoir (R1, R2), wherein said second outlet pipe (12, 12') is combined with a valve (V1, V4).

11. The power plant of claim 10, wherein the second outlet pipe (12, 12') for discharging steam present in a reservoir is connected to a duct (22) feeding the discharged steam into a condenser (C) adapted to convert the discharged steam to a liquid, wherein said condenser (C) is connected by a duct (24) comprising a pumping means (P1) for feeding the liquid deriving from the converting of discharged steam in a liquid to the heating means of the pressurized unit (UP) for producing superheated steam from said liquid.

12. The power plant of claim 11, wherein the heating means (CS,CF) for producing the superheated steam (CS, CF) and the at least one reservoir (R1, R2) form a second closed circuit with the condenser (C) and the pumping system (P1).

13. The power plant of claim 1, further comprising (a) at least one set of four reservoirs (R1, R2 and R'$_1$, R'$_2$) adapted to receive steam under a pressure of over $5 \times 10^5$ Pa deriving from the heating element (CF,CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is stable for at least one hour.

14. The power plant of claim 1, further comprising (a) at least one set of four reservoirs that are identical (R1, R2 and R'$_1$, R'$_2$) and adapted to receive steam under a pressure of over 5×10⁵ Pa deriving from the heating element (CF,CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is stable for at least one hour.

15. The power plant of claim 1, further comprising at least one first reservoir (R1) and a second reservoir (R2) mounted in parallel, wherein each of said reservoirs (R1, R2) resists inner pressures of over $5 \times 10^5$ Pa and contains the liquid to be pressurised, wherein each reservoir (R1, R2) is combined:
with said at least one first outlet pipe (14, 14') with a valve (V5, V7) for liquid under pressure from the reservoir,
with a second outlet pipe (12, 12') for discharging steam present in the reservoir considered, wherein the second outlet pipe (12, 12') is combined with a valve (V1, V4),
with said first inlet pipe (10, 10'), with a valve (V6, V8) for feeding liquid into the reservoir (R1, R2), and
with said second inlet pipe (16, 16') for feeding a superheated steam into the reservoir (R1, R2).

16. The power plant of claim 1, further comprising at least one collector (FR) adapted to recover liquid after acting on the Pelton turbine (P), wherein said collector (FR of R3) is at a higher level relative to said at least one reservoir (R1, R2) to allow filling of the at least one reservoir (R1, R2) with liquid flowing from the collector (FR) by the force of gravity via a duct (21) extending between said collector (FR) and said first inlet pipe (10, 10') of the reservoir, whereby a first closed circuit for the liquid is formed between the Pelton turbine (P) and the at least one reservoir (R1, R2).

17. The power plant of claim 1, further comprising a series of twinned reservoirs (R1, R2) adapted to supply a series of Pelton turbines (P).

18. The power plant of claim 1, wherein the power plant is adapted to work with an aqueous medium as liquid, and with water superheated steam, wherein the aqueous medium is liquid and the water superheated stream is superheated stream.

19. The power plant of claim 18, wherein the aqueous medium contains more than 90% by weight of water, wherein the superheated steam is a steam consisting of more than 90% by volume of water superheated steam under pressure.

20. The power plant of claim 1, wherein said power plant comprises a condenser (C) of steam discharged from the at least one reservoir (R1, R2), wherein said condenser (C) comprises a heat exchange element wherein a fluid circulates to ensure the condensation of the steam to a liquid, said heat exchange element of the condenser (C) being adapted to be connected to an exchanger enabling heat derived from the condensation to be use in cogeneration.

21. The power plant of claim 1, wherein said power plant is adapted to operate at superheated steam under pressure over $10 \times 10^5$ Pa, and with temperature of between 110° C. and 600° C.

22. The power plant of claim 21, wherein said power plant is adapted to operate with water superheated steam pressurized over $50 \times 10^5$ Pa with temperature exceeding 150° C.

23. A method for the production of electrical energy using a power plant selected from the group consisting of thermal and solar thermodynamic power plants based on a thermodynamic cycle, for generating an energy derived from a liquid under pressure, said method comprising the steps of:
(a) pressurizing a liquid into a liquid under pressure with at least one unit, said unit (UP) being adapted for generating an energy derived from the liquid under pressure, wherein said pressurizing comprises:
(i) subjecting said liquid to a heating means to produce a superheated steam under pressure, wherein said heating means is selected from the group consisting of a heating element burning combustible material (CF), a heating element of the concentrating solar type, a heating element of the thermodynamic solar type (CS), and a combination thereof; and
(ii) compressing said superheated steam under pressure in at least one reservoir (R1,R2) to form said liquid under pressure in said at least one reservoir, wherein said at least one reservoir is suitable for resisting internal pressures of over $5 \times 10^5$ Pa;
(b) feeding said liquid under pressure through at least one injector fitted on at least one duct system (20) to at least one Pelton turbine (P) comprising a rotating shaft, wherein said at least one duct system (20) is connected to the at least one unit and said feeding rotates the rotating shaft of said at least one Pelton turbine to thereby produce mechanical energy; and
(c) converting at least a portion of the mechanical energy into electrical energy via at least one converting system selected from the group consisting of generators and alternators, wherein said at least one converting system has a shaft connected to said rotating shaft of said at least one Pelton turbine via a connecting system, wherein said connecting system either: (1) directly drives said shaft of said at least one converting system via said at least one rotating shaft of said at least one Pelton turbine and/or (2) drives said shaft of said at least one converting system via said at least one rotating shaft of said at least one Pelton turbine and a gear system;
wherein said at least one reservoir is in fluid communication with:
(1) at least a first outlet pipe (14, 14') with a valve (V5, V7) for conducting the liquid under pressure into the duct system (20),
(2) a first inlet pipe (10, 10') with a valve (V6, V8) for feeding liquid into the at least one reservoir, and
(3) a second inlet pipe (16, 16') for feeding said superheated steam under pressure into said at least one reservoir via a supply duct (23) connecting said heating means to said second inlet pipe,
wherein said at least one reservoir comprises an insulated floating piston element (K) that floats on the surface of the liquid present in the reservoir.

24. The method of claim 23, the power plant is selected from the group consisting of thermal and solar thermodynamic power plants based on a thermodynamic cycle is equivalent to a Rankine steam cycle.

25. The method of claim 23, wherein for each reservoir (R1,R2) containing liquid with an upper surface, the insulated floating piston element (K) covers more than 90% of the upper surface of said liquid present in the reservoir (R1,R2).

26. The method of claim 23, wherein for each reservoir (R1,R2) containing liquid with an upper surface, the insulated floating piston element (K) covers more than 99% of the upper surface of said liquid present in the reservoir (R1,R2).

27. The method of claim 23, wherein the Pelton turbine is associated to a collecting system for collecting water deriving from the Pelton turbine, said collecting system (FR) being connected to each reservoir by a return duct (21) for returning liquid from the collecting system (FR) to the reservoir (R1,R2), each reservoir of the at least one reservoir (R1,R2) has an elongated shape and is associated to the insulated floating piston element (K) designed to float on the upper surface of the liquid present in the reservoir (R1,R2), said insulated floating piston element (K) being adapted to define in the reservoir (R1,R2) an upper part adapted to receive the superheated steam from the heating means (CS,CF) via the supply duct (23), and a lower part adapted to receive liquid deriving from the collecting system (FR) through the return duct (21), wherein at least the upper part is provided with at least one insulation layer, whereby liquid from the collecting system is fed in the lower part of at least one reservoir.

28. The method of claim 23, wherein the Pelton turbine is associated to a collecting system for collecting water deriving from the Pelton turbine, said collecting system (FR) being connected to each reservoir by a return duct (21) for returning liquid from the collecting system (FR) to the reservoir (R1,R2), wherein each reservoir of the at least one reservoir (R1,R2) has an elongated shape and is associated to the insulated floating piston element (K) designed to float on the upper surface of the liquid present in the reservoir (R1,R2), said insulated floating piston element (K) being adapted to define in the reservoir (R1,R2) an upper part adapted to receive the superheated steam from the heating means (CS,CF) via the supply duct (23) and condensation liquid deriving from the superheated steam, and a lower part adapted to receive liquid deriving from the collecting system (FR) through the return duct (21), wherein at least the upper part is provided with at least one insulation layer.

29. The method of claim 28, wherein the upper part and the lower part of each reservoir (R1,R2) are attached to each other with an interposition of the insulating layer.

30. The method of claim 28, wherein the upper part and the lower part of each reservoir (R1,R2) are attached to each other with an interposition of the insulating layer, wherein the interposition has a free edge pointing inwardly the reservoir to touches an outer wall of the insulated floating piston element (K).

31. The method of claim 23, wherein each reservoir (R1, R2) is thermally insulated to enable an expansion selected from the group consisting of polytropic expansion and isentropic expansion of the superheated steam introduced in the reservoir, whereby the superheated steam fed to the at least one reservoir for pressurizing the liquid is expanded following an expansion selected from the group consisting of polytropic expansion and isentropic expansion.

32. The method of claim 23, wherein each reservoir (R1, R2) is also combined with a second outlet pipe (12, 12') for discharging steam present in the reservoir (R1, R2) under pressure, wherein said second outlet pipe (12, 12') is combined with a valve (V1, V4), whereby when discharging steam present in a reservoir, the pressure inside said reservoir is reduced.

33. The method of claim 32, wherein the second outlet pipe (12, 12') for discharging steam present in the at least one reservoir is connected to a duct (22) feeding the discharged steam into a condenser (C) adapted to convert the discharged steam to a liquid, wherein said condenser (C) is connected by a duct (24) comprising a pumping means (P1) for feeding the liquid deriving from the converting of discharged steam in a liquid to the heating means of the pressurized unit (UP) for producing superheated steam from said liquid, whereby liquid from the condenser is pumped by the pumping means into the heating means, and whereby said liquid is converted in superheated steam under pressure in said heating means.

34. The method of claim 23, wherein the power plant further comprises (a) at least one set of four reservoirs (R1, R2 and R'$_1$, R'$_2$) adapted to receive steam under a pressure of over $5 \times 10^5$ Pa deriving from the heating element (CF,CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is stable for at least one hour.

35. The method of claim 23, wherein the power plant further comprises (a) at least one set of four reservoirs that are identical (R1, R2 and R'$_1$, R'$_2$) and adapted to receive steam under a pressure of over $5 \times 10^5$ Pa deriving from the heating element (CF,CS) and adapted to contain liquid under pressure intended for the Pelton turbine (P), and (b) a control system for the reservoirs for controlling the outflow of liquid under pressure from the reservoirs, so as to feed liquid under pressure to the Pelton turbine so that the converting system is able to generate an electrical energy that is stable for at least one hour.

36. The method of claim 23, wherein the process plant further comprises at least one first reservoir (R1) and a second reservoir (R2) mounted in parallel, wherein each of said reservoirs (R1, R2) resists inner pressures of over $5 \times 10^5$ Pa and contains the liquid to be pressurized, wherein each reservoir (R1, R2) is combined:
   (i) with said at least one first outlet pipe (14, 14') with a valve (V5, V7) for liquid under pressure from the reservoir,
   (ii) with a second outlet pipe (12, 12') for discharging steam present in the reservoir considered, wherein the second outlet pipe (12, 12') is combined with a valve (V1, V4),
   (iii) with said first inlet pipe (10, 10'), with a valve (V6, V8) for feeding liquid into the reservoir (R1, R2), and
   (iv) with said second inlet pipe (16, 16') for feeding a superheated steam into the reservoir (R1, R2).

37. The method of claim 36, wherein the heating means (CS,CF) for producing the superheated steam (CS, CF) and the at least one reservoir (R1, R2) form a second closed circuit with the condenser (C) and the pumping system (P1), whereby reducing the loss of liquid for producing the superheated steam.

38. The method of claim 23, wherein the power plant further comprises at least one collector (FR) adapted to recover liquid after acting on the Pelton turbine (P), wherein said collector (FR of R3) is at a higher level relative to at least one reservoir (R1, R2) to allow filling of the at least one reservoir (R1, R2) with liquid flowing from the collector (FR) by the force of gravity via a duct (21) extending between said collector (FR) and said first inlet pipe (10, 10') of the reservoir, whereby a first closed circuit for the liquid is formed between the Pelton turbine (P) and the at least one reservoir (R1, R2).

39. The method of claim 23, wherein the power plant comprises a series of twinned reservoirs (R1, R2) adapted to supply a series of Pelton turbines (P).

40. The method of claim 39, wherein at least one set of identical reservoirs is used (R1, R2 and R' 1 and R'2) to pressurize a liquid by means of superheated steam, and wherein the filling and draining cycle of a first pair of reservoirs (R1, R2) is combined, while another pair of reservoirs (R' 1 and R'2) is offset relative to each other in order to control the supply of steam under pressure deriving from the boiler, continuously without interruption.

41. The method of claim 23, wherein an aqueous medium is used as said liquid under pressure for driving the converting system, wherein water superheated steam under pressure is used as the superheated steam for pressurizing the liquid present in the reservoir fed to the Pelton turbine.

42. The method of claim 41, wherein the aqueous medium contains more than 90% by weight of water, wherein the superheated steam is a steam consisting of more than 90% by volume of water superheated steam under pressure.

43. The method of claim 23, wherein the plant further comprises a condenser (C) of steam discharged from the at least one reservoir (R1, R2), wherein said condenser (C) comprises a heat exchange element wherein a fluid circulates to ensure the condensation of the steam to a liquid, said heat exchange element of the condenser (C) being adapted to be connected to an exchanger enabling heat derived from the condensation to be use in cogeneration.

44. The method of claim 23, wherein said power plant operates with superheated steam under pressure over $10 \times 10^5$ Pa, and with temperature of between 110° C. and 600° C. for pressurizing liquid present in the at least one reservoir fed to the at least one Pelton turbine.

45. The method of claim 44, wherein said power plant operates with superheated steam under pressure over $50 \times 10^5$ Pa, and with temperature exceeding 150° C. for pressurizing liquid present in the at least one reservoir fed to the at least one Pelton turbine.

\* \* \* \* \*